(12) United States Patent
Kim

(10) Patent No.: US 12,262,249 B2
(45) Date of Patent: Mar. 25, 2025

(54) TELEMATICS COMMUNICATION UNIT AND SERVER FOR CONTROLLING SAME IN NEXT GENERATION MOBILE COMMUNICATION SYSTEM

(71) Applicant: LG ELECTRONICS INC., Seoul (KR)

(72) Inventor: Cheolseung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 655 days.

(21) Appl. No.: 17/596,350

(22) PCT Filed: Jul. 3, 2019

(86) PCT No.: PCT/KR2019/008127
§ 371 (c)(1),
(2) Date: Dec. 8, 2021

(87) PCT Pub. No.: WO2021/002502
PCT Pub. Date: Jan. 7, 2021

(65) Prior Publication Data
US 2022/0225168 A1 Jul. 14, 2022

(51) Int. Cl.
*H04W 28/10* (2009.01)
*H04W 4/40* (2018.01)
(Continued)

(52) U.S. Cl.
CPC ........... *H04W 28/10* (2013.01); *H04W 24/10* (2013.01); *H04W 28/0278* (2013.01); *H04W 4/40* (2018.02)

(58) Field of Classification Search
None
See application file for complete search history.

(56) References Cited

U.S. PATENT DOCUMENTS

| | | | | |
|---|---|---|---|---|
| 2012/0127915 A1* | 5/2012 | Moberg | ................. | H04B 7/155 370/315 |
| 2014/0153392 A1* | 6/2014 | Gell | ................. | H04W 28/0236 370/230 |

(Continued)

FOREIGN PATENT DOCUMENTS

| | | |
|---|---|---|
| JP | 2018191227 | 11/2018 |
| KR | 20090009470 | 1/2009 |

(Continued)

OTHER PUBLICATIONS

PCT International Application No. PCT/KR2019/008127, International Search Report dated Mar. 30, 2020, 4 pages.

(Continued)

*Primary Examiner* — Scott M Sciacca
(74) *Attorney, Agent, or Firm* — LEE, HONG, DEGERMAN, KANG & WAIMEY

(57) ABSTRACT

A disclosure of the present specification provides a server for controlling a telematics communication unit (TCU) mounted in a vehicle in a next generation mobile communication system. The server may comprise: a transceiver unit; and a processor for controlling the transceiver unit. The processor may perform the steps of: receiving information of a first channel state between the TCU and a base station and information of a second channel state between the TCU and an electronic device in the vehicle; on the basis of the first and second channel state information, generating a first table based on data rates of downlink sections among the base station, the TCU, and the electronic device in the vehicle; and transmitting downlink data to the TCU through the base station on the basis of the first table.

14 Claims, 19 Drawing Sheets

(51) Int. Cl.
*H04W 24/10* (2009.01)
*H04W 28/02* (2009.01)

(56) References Cited

U.S. PATENT DOCUMENTS

| | | | |
|---|---|---|---|
| 2015/0358853 A1* | 12/2015 | Kiss | H04W 28/0263 |
| | | | 370/230 |
| 2017/0230102 A1* | 8/2017 | Fertl | H04B 7/15521 |
| 2017/0230803 A1 | 8/2017 | Calabuig Gaspar et al. | |
| 2018/0063731 A1* | 3/2018 | Ashrafi | H04W 24/04 |
| 2019/0394672 A1* | 12/2019 | Mukherjee | H04W 8/04 |
| 2020/0119821 A1* | 4/2020 | Qin | H04W 24/08 |

FOREIGN PATENT DOCUMENTS

| | | |
|---|---|---|
| KR | 10-2013-0059504 | 6/2013 |
| KR | 20140074703 | 6/2014 |
| WO | 2017135580 | 8/2017 |

OTHER PUBLICATIONS

Korean Intellectual Property Office Application No. 10-2021-7035112, Office Action dated Mar. 26, 2024, 5 pages.

* cited by examiner

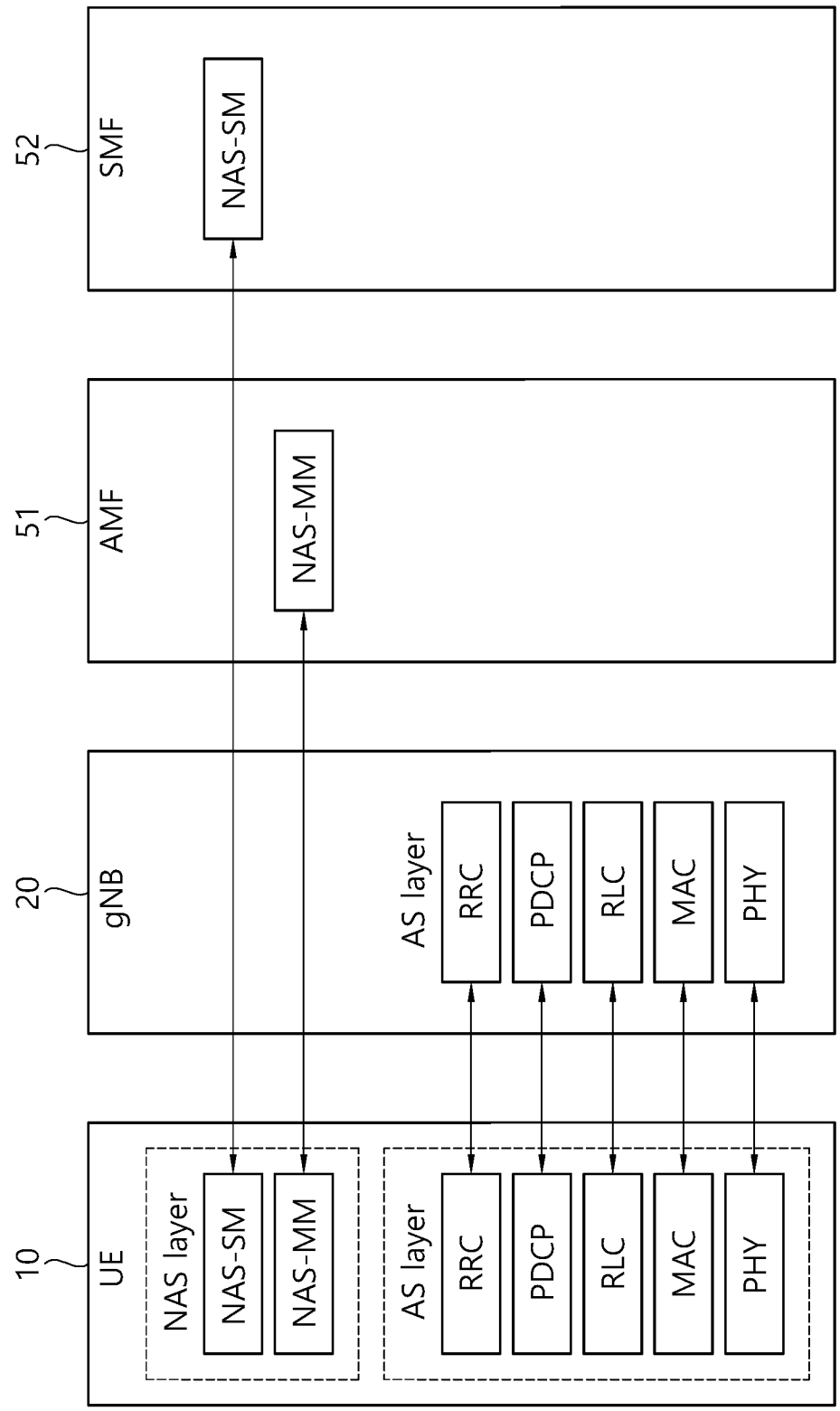

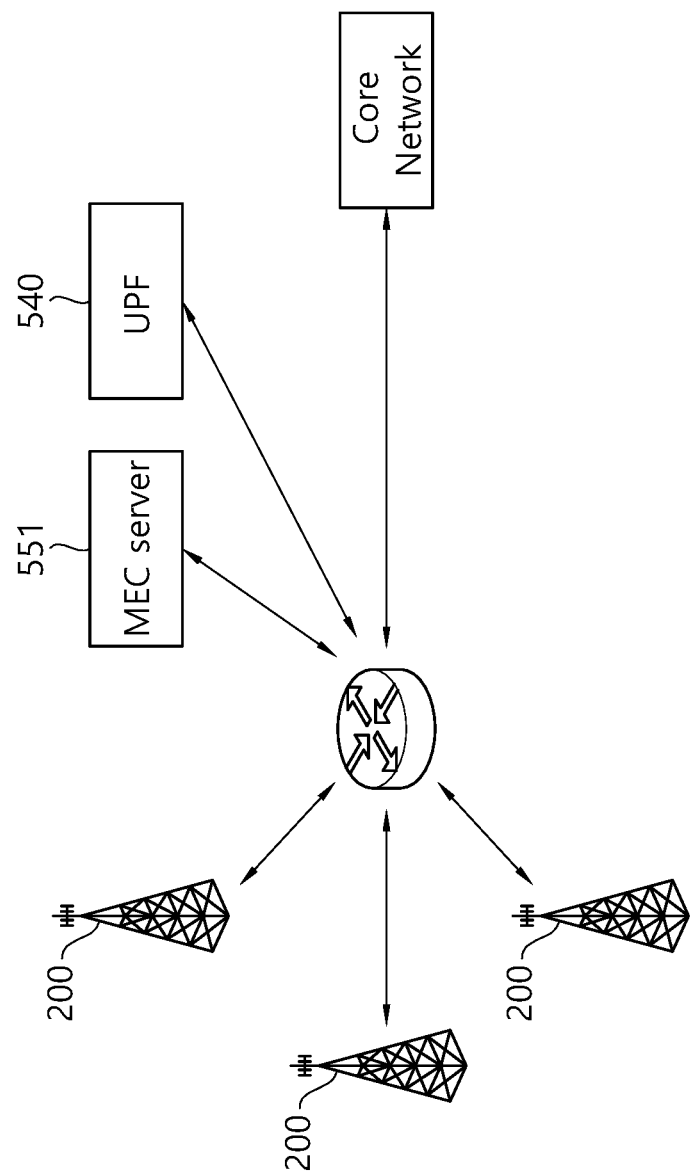

TELEMATICS COMMUNICATION UNIT AND SERVER FOR CONTROLLING SAME IN NEXT GENERATION MOBILE COMMUNICATION SYSTEM

CROSS-REFERENCE TO RELATED APPLICATIONS

This application is the National Stage filing under 35 U.S.C. 371 of International Application No. PCT/KR2019/008127, filed on Jul. 3, 2019, the contents of which is hereby incorporated by reference herein in its entirety.

TECHNICAL FIELD

The present disclosure relates to communication with a telematics communication unit installed in a vehicle in next-generation mobile communication.

BACKGROUND

With the success of Long-Term Evolution (LTE)/LTE-Advanced (LTE-A) for 4th-generation mobile communication, there is a growing interest in next-generation mobile communication, i.e., 5th-generation mobile communication (known as 5G), and extensive research on the 5th-generation mobile communication are being conducted.

5G mobile communication defined by the International Telecommunication Union (ITU) provides a data transfer rate of up to 20 Gbps and a sensory transfer rate of at least 100 Mbps anytime anywhere. 5G mobile communication is formally named 'IMT-2020' and aims to be commercialized worldwide by 2020.

The ITU presents three usage scenarios, e.g., enhanced Mobile Broadband (eMBB), massive Machine-Type Communication (mMTC), and Ultra-Reliable Low-Latency Communication (URLLC).

First, URLLC relates to a usage scenario in which a high reliability and a low latency are required. For example, a service, such as autonomous driving, factory automation, and augmented reality, requires a high reliability and a low latency (e.g., a latency of 1 ms or less). Currently, a latency in 4G (LTE) is statistically 21 to 43 ms (best 10%) and 33 to 75 ms (median). This latency is inadequate to support a service requiring a latency of 1 ms or less.

Next, eMBB relates to a usage scenario in which a mobile ultra-wide band is required.

It is considered that a core network designed for existing LTE/LTE-A has difficulty in accommodating a high-speed service in the ultra-wide band.

Therefore, it is urgently required to redesign a core network for 5G mobile communication.

FIG. 1 illustrates a structure of a next-generation mobile communication network.

A 5G Core (5GC) may include various components, among which an Access and mobility Management Function (AMF) 51, a Session Management Function (SMF) 52, and a Policy Control Function (PCF) 53, a User Plane Function (UPF) 54, an Application Function (AF) 55, a Unified Data Management (UDM) 56, and a Non-3GPP Interworking Function (N3IWF) 59 are illustrated as some components in FIG. 1.

A UE 10 is connected to a data network 60 via the UPF 55 through a Next-Generation Radio Access Network (NG-RAN).

The UE 10 may also be provided with a data service through untrusted non-3GPP access, e.g., a Wireless Local Area Network (WLAN). To connect the non-3GPP access to a core network, the N3IWF 59 may be deployed.

<Automotive Driving>

Autonomous driving is expected to be an important new driving force for 5G with various applications of mobile communications to vehicles.

In autonomous driving in which a server remotely controls a vehicle, to achieve Ultra-Reliable Low-Latency Communication (URLLC) stipulated in 5G, within 5 msec or less, the vehicle needs to transmit data to the server, receive control data from the server, and operate.

However, in a conventional cloud server-based network structure (e.g., base station-wired network-cloud server), it takes about 30 to 40 msec for the base station to transmit data received from a vehicle to the cloud server, for the cloud server to analyze the data and transmit the data to the base station, and for the base station to receive the data.

To improve the conventional network structure and to achieve URLLC, the European Telecommunications Standards Institute (ETSI) and 5GAA are discussing Multi-access Edge Computing (MEC). However, there is no conventional method for quickly and efficiently performing data transmission and reception between an MEC server and a Telematics Communication Unit (TCU) provided in a vehicle.

SUMMARY

Therefore, an aspect of embodiments of the present disclosure is to solve the foregoing problems.

To achieve the foregoing aspect, an embodiment of the present specification provides a server for controlling a Telematics Communication Unit (TCU) mounted in a vehicle in a next-generation mobile communication system. The server may comprise a transceiver; and a processor to control the transceiver. The processor may be configured to perform operations comprising: receiving first channel state information between the TCU and a base station and second channel state information between the TCU and an electronic device in the vehicle, generating a first table based on a data rate in a downlink period between the base station, the TCU, and the electronic device in the vehicle, based on the first channel state information and the second channel state information, and transmitting downlink data to the TCU through the base station based on the first table.

The processor may be further configured to perform operations comprising: generating a third table based on a data rate in an uplink period between the base station, the TCU, the electronic device in the vehicle, based on the first channel state information and the second channel state information.

The processor may be further configured to perform operations comprising: identifying a bottleneck period in the downlink period.

Identifying the bottleneck period may comprise: generating a second table based on a data rate according to a pair of a reception (Rx) antenna of the TCU and a transmission (Tx) antenna of the TCU.

Identifying the bottleneck period may comprise: receiving information on an available buffer size from the TCU, and identifying the bottleneck period based on the received information on the available buffer size.

The processor may be further configured to perform operations comprising: reducing a data rate of the downlink data to resolve a bottleneck.

The first table may comprise a transmission priority and a data rate of the downlink data.

To achieve the foregoing aspect, an embodiment of the present specification provides a Telematics Communication Unit (TCU) mounted in a vehicle. The TCU may comprise a transceiver; and a processor to control the transceiver. The processor may be configured to perform operations comprising: generating a table based on a channel state with at least one electronic device in the vehicle, calculating an available buffer size for transmitting data to the at least one electronic device in the vehicle, and transmitting information on the available buffer size to a server through a base station.

The processor may be further configured to perform operations comprising: comparing the available buffer size with an expected residual data size in a buffer, and re-calculating the available buffer size based on the comparison.

The processor may be further configured to perform operations comprising: transmitting information on the channel state to the server through the base station.

The processor may be further configured to perform operations comprising: identifying information on a reception antenna of the TCU for receiving downlink data from the base station and information on a transmission antenna for the TCU to transmit the downlink data to the electronic device in the vehicle.

The processor may be further configured to perform operations comprising: transmitting information on a pair of the reception antenna and the transmission antenna to the MEC through the base station.

The processor may be further configured to perform operations comprising: transmitting a pilot signal to the at least one electronic device in the vehicle, and receiving channel state information from the at least one electronic device.

The processor may be further configured to perform operations comprising: identifying a bottleneck period in a downlink period between the base station, the TCU, and the electronic device in the vehicle.

The transceiver may comprise a Long-Term Evolution (LTE) transceiver, a 5G transceiver, and a Wireless Local Area Network (WLAN).

The 5G transceiver may comprise a first 5G transceiver using a sub-6 GHz band and a second 5G transceiver using mmWave.

The electronic device in the vehicle may comprise at least one of an Engine Control Unit (ECU), a Domain Control Unit (DCU), a Local Interconnect Network (LIN) master, a Media Oriented System Transport (MOST) master, an Ethernet switch, a radar sensor, a LiDAR sensor, a camera, an Audio Video Navigation (AVN), and a Rear Side Entertainment (RSE).

According to an embodiment of the present disclosure, it is possible to solve the existing problems.

BRIEF DESCRIPTION OF THE DRAWINGS

FIG. 4 illustrates the structure of a radio interface protocol between a UE and a gNB.

FIG. 5a to FIG. 5d illustrate examples of implementing a MEC server.

DETAILED DESCRIPTION

Figure 1:
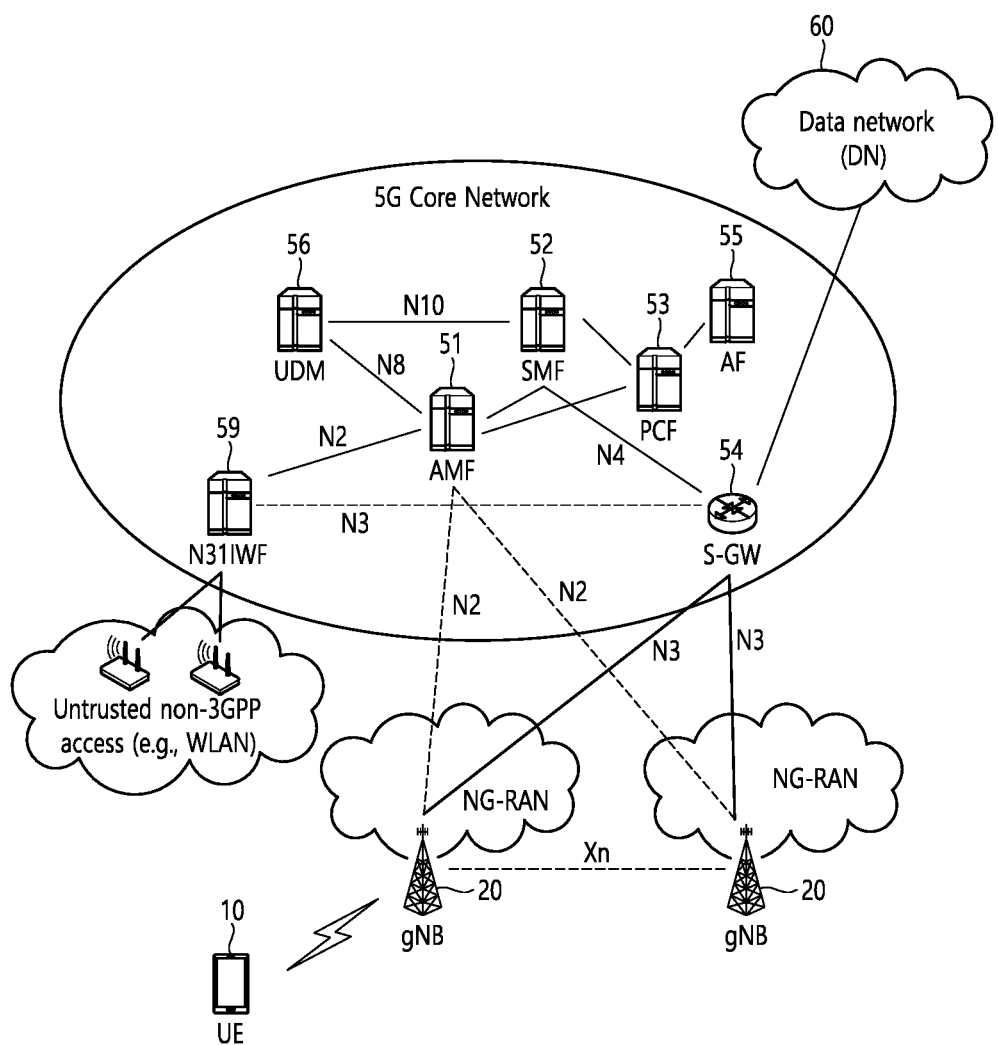
FIG. 1 illustrates a structure of a next-generation mobile communication network.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term "include" or "have" may represent the existence of a feature, a number, a step, an operation, a component, a part or the combination thereof described in the specification, and may not exclude the existence or addition of another feature, another number, another step, another operation, another component, another part or the combination thereof.

The terms "first" and "second" are used for the purpose of explanation about various components, and the components are not limited to the terms "first" and "second". The terms "first" and "second" are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the disclosure readily understood, but not should be intended to be limiting of the disclosure. It should be understood that the disclosure may be expanded to its modifications, replacements or equivalents in addition to what is shown in the drawings.

<Structure of Next-Generation Mobile Communication System>

Figure 2:
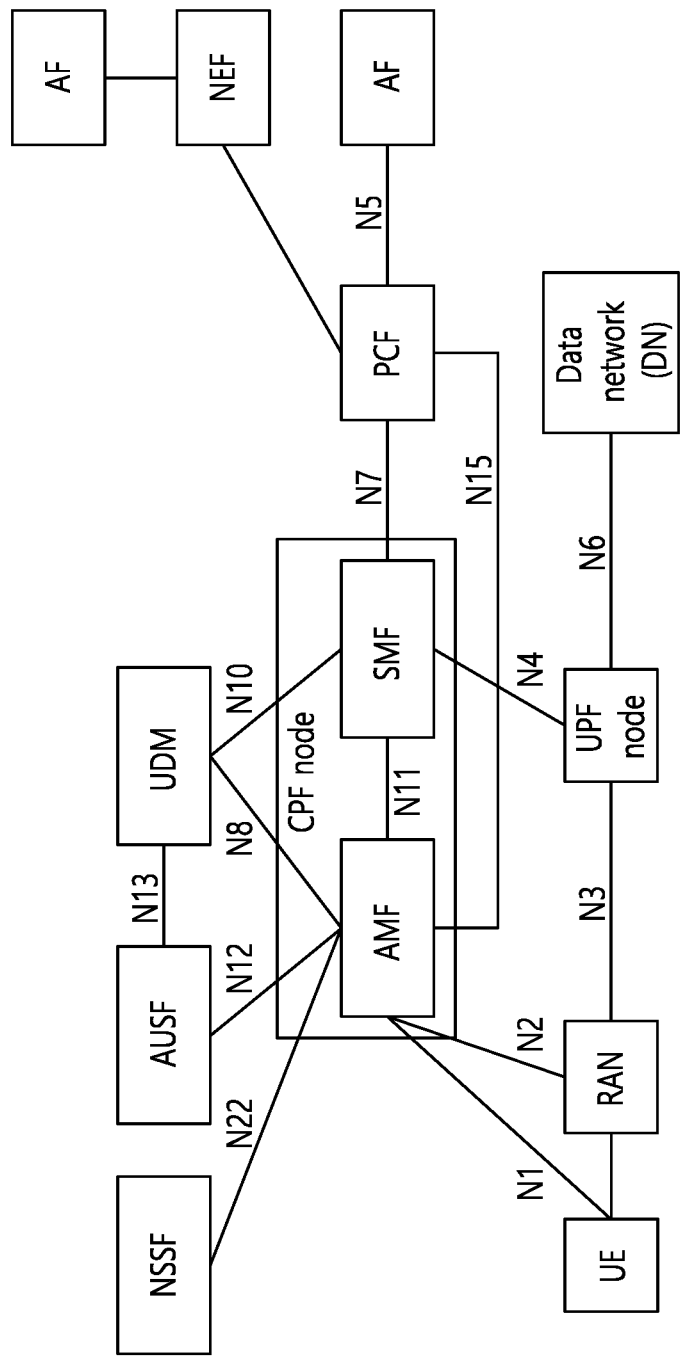
FIG. 2 illustrates an expected structure of next-generation mobile communication from the perspective of a node.

FIG. 2 illustrates an expected structure of next-generation mobile communication from the perspective of a node.

Referring to FIG. 2, a UE is connected to a Data Network (DN) through a next-generation Radio Access Network (RAN).

An illustrated Control Plane Function (CPF) node performs all or some of functions of a Mobility Management Entity (MME) of 4G mobile communication and all or some of functions of control-plane functions of a Serving Gateway (S-GW) and a PDN Gateway (P-GW). The CPF node includes an Access and mobility Management Function (AMF) and a Session Management Function (SMF).

An illustrated User Plane Function (UPF) node is a type of a gateway through which user data is transmitted and received. The UPF node may perform all or some of user-plane functions of the S-GW and the P-GW of 4G mobile communication.

An illustrated Policy Control Function (PCF) is a node that controls a policy of an operator.

An illustrated Application Function (AF) is a server for providing a plurality of services to a UE.

An illustrated Unified Data Management (UDM) is a type of a server that manages subscriber information like a Home Subscriber Server (HSS) of 4G mobile communication. The UDM stores the subscriber information in a Unified Data Repository (UDR) and manages the same.

An illustrated Authentication Server Function (AUSF) authenticates and manages a UE.

An illustrated Network Slice Selection Function (NSSF) is a node for network slicing as described below.

In FIG. 2, a UE can simultaneously access two data networks using multiple Protocol Data Unit (PDU) sessions.

Figure 3:
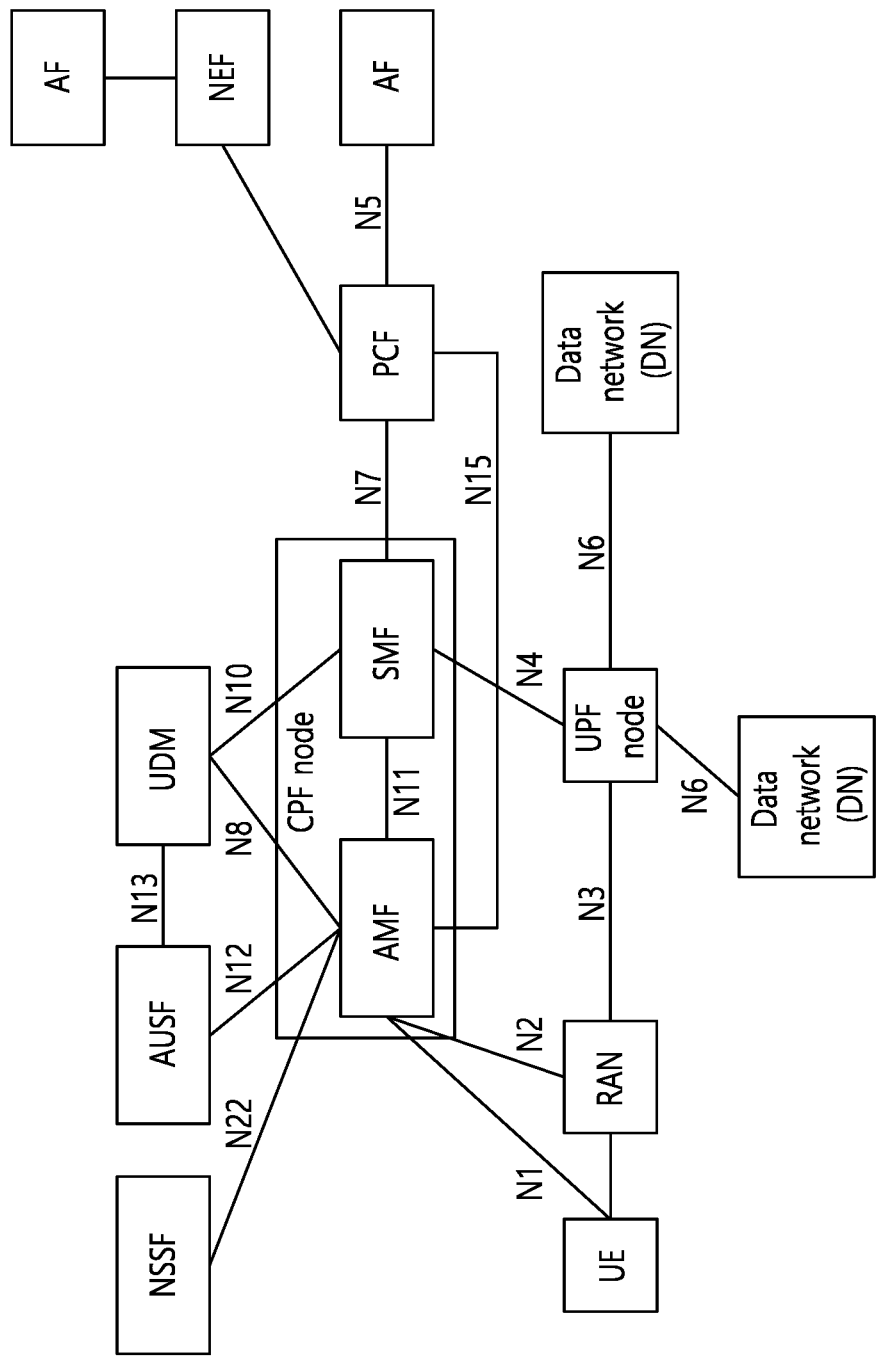
FIG. 3 illustrates an architecture for supporting simultaneous access to two data networks.

FIG. 3 illustrates an architecture for supporting simultaneous access to two data networks.

FIG. 3 shows an architecture for a UE to simultaneously access two data networks using one PDU session.

In FIG. 2 and FIG. 3, an AF by a third party other than an operator may be connected to a 5GC through a Network Exposure Function (NEF).

FIG. 4 illustrates the structure of a radio interface protocol between a UE and a gNB.

The radio interface protocol is based on a 3GPP radio access network standard. The radio interface protocol horizontally includes a physical layer, a data link layer, and a network layer, and vertically includes a user plane for data transfer and a control plane for signal transfer.

The protocol layers may be divided into L1 (first layer), L2 (second layer), and L3 (third layer) based on lower three layers of the Open System Interconnection (OSI) reference model widely known in communication systems.

Hereinafter, each layer of the radio protocol is described.

A physical layer, which is the first layer, provides an information transfer service using a physical channel. The physical layer is connected to an upper medium access control layer through a transport channel, and data is transmitted between the medium access control layer and the physical layer through the transport channel. Data is transmitted between different physical layers, i.e., physical layers of a transmitter and a receiver, through a physical channel.

The second layer includes the Medium Access Control (MAC) layer, a Radio Link Control (RLC) layer, and a Packet Data Convergence Protocol (PDCP) layer.

The third layer includes a Radio Resource Control (hereinafter abbreviated to RRC) layer. The RRC layer is defined only in the control plane and is responsible for control of a logical channel, the transport channel and the physical channels in relation to establishment, reestablishment, and release of a Radio Bearer (abbreviated to RB). Here, the RB refers to a service provided by the second layer for data transfer between a UE and an E-UTRAN.

A Non-Access Stratum (NAS) layer performs functions of session management and mobility management.

The NAS layer is divided into a NAS entity for Mobility Management (MM) and a NAS entity for Session Management (SM).

1) The NAS entity for MM provides the following general functions.

As NAS procedures related to an AMF, the following is included.

Registration management and access management procedures. The AMF supports the following function.

Secure NAS signal connection between a UE and the AMF (integrity protection and encryption)

2) The NAS entity for SM performs session management between a UE and an SMF.

An SM signaling messages are processed, i.e., generated and processed, in NAS-SM layers of the UE and SMF. The content of the SM signaling message is not interpreted by the AMF.

In SM signaling transmission,
The NAS entity for MM generates a NAS-MM message for deriving a method and a location for transmitting the SM signaling message through a security header indicating NAS transmission of SM signaling and received additional information on NAS-MM.
In SM signaling reception, the NAS entity for SM performs an integrity check of the NAS-MM message and interprets the additional information, thereby deriving the method and a location for deriving the SM signaling message.

In FIG. 4, the RRC layer, the RLC layer, the MAC layer, and the PHY layer positioned below the NAS layer are collectively referred to as an Access Stratum (AS).

<Multi-Access Edge Computing (MEC)>

To achieve Ultra-Reliable Low-Latency Communications (URLLC), the European Telecommunications Standards Institute (ETSI) and 5GAA are discussing Multi-access Edge Computing (MEC).

MEC is a network architecture that enables a cloud computing function and an IT service environment on the edge of a cellular network (generally on the edge of any network). The basic idea of MEC is to execute applications and conduct processing operations related to cellular customers, thereby reducing network congestion and enabling the applications to be properly performed. MEC technology is designed to be implemented in a cellular base station or other edge nodes. MEC technology enables flexible and rapid distribution of new applications and new services for customers. MEC enables cellular operators to open a Radio Access Network (RAN) to authorized third parties, such as application developers and content providers.

A MEC server described herein refers to a communication device that provides a cloud computing function or an IT service environment on the edge of a network.

FIG. 5a to FIG. 5d illustrate examples of implementing a MEC server.

In FIG. 5a to FIG. 5d, a UPF node 540 is a type of gateway through which user data is transmitted and received. The UPF node 540 may perform all or some of user-plane functions of a Serving-Gateway (S-GW) and a Packet data network-Gateway (P-GW) of 4G mobile communication. A core network 500 may be an Evolved Packet Core (EPC) or a 5G Core network (5GC). N3 is a reference point between an (R)AN and the UPF node 540. N6 is a reference point between the UPF node 540 and a data network. A base station 200 may be a 5G base station (gNB) or an LTE base station (eNB). The base station 200 may be a base station including both a gNB and an eNB.

Logically, a MEC server (MEC host) 551 may be implemented in an edge or central data network. The UPF node 540 may serve to adjust User-Plane (UP) traffic to a target MEC application (application in the MEC server 551) of the data network. The positions of the data network and UPF may be selected by a network operator. The network operator may deploy physical computing resources based on technical and business parameters, such as available facilities, supported applications, application requirements, and measured or estimated user load. A MEC management system may dynamically determine a position to which a MEC application is distributed by adjusting the operations of the MEC server 551 (MEC host) and the application.

Figure 5A:
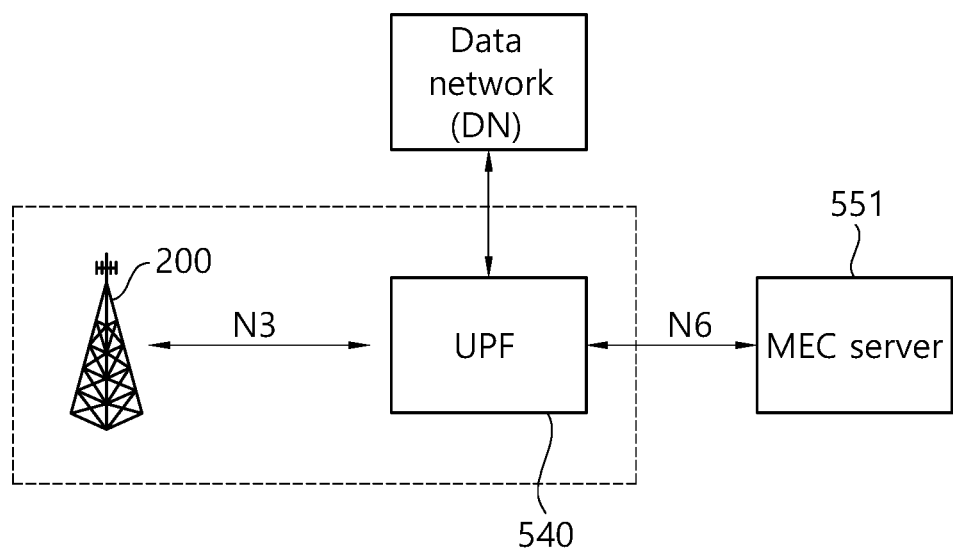
Figure 5B:
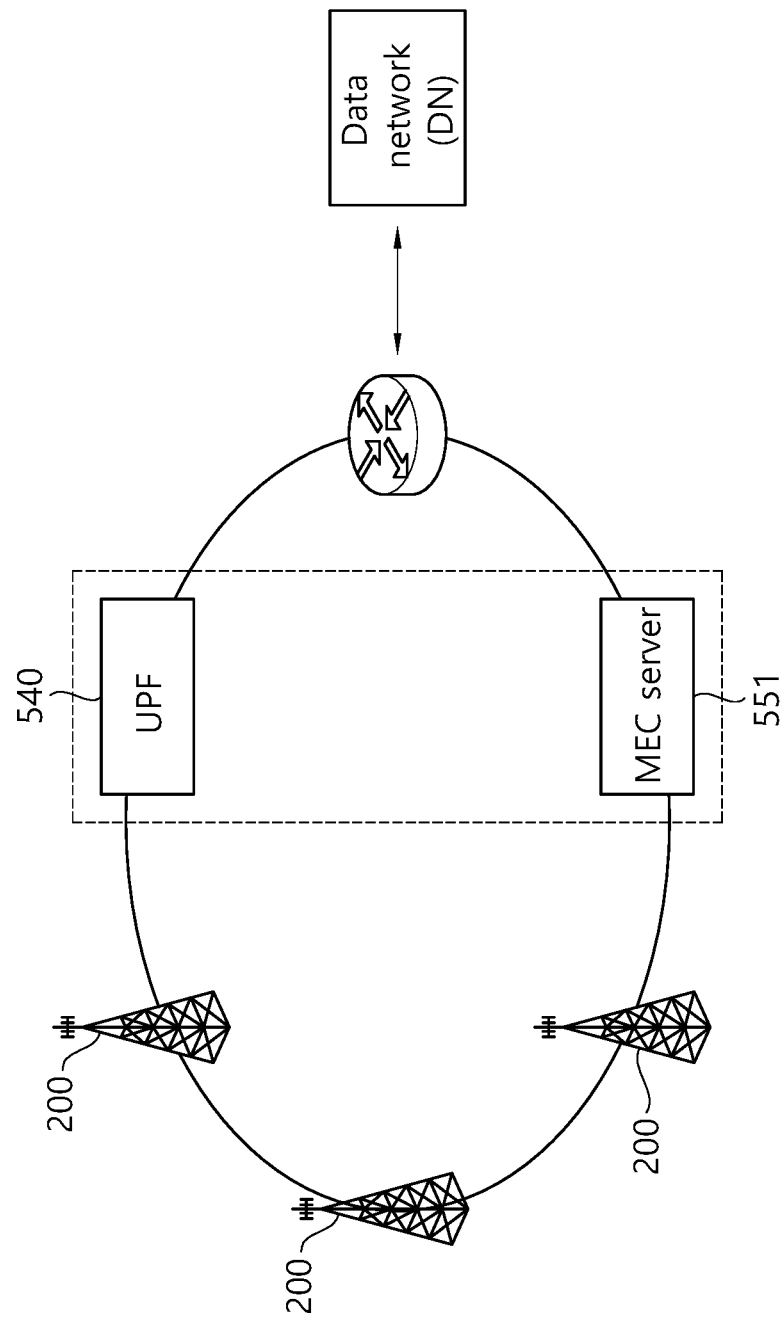
Figure 5D:
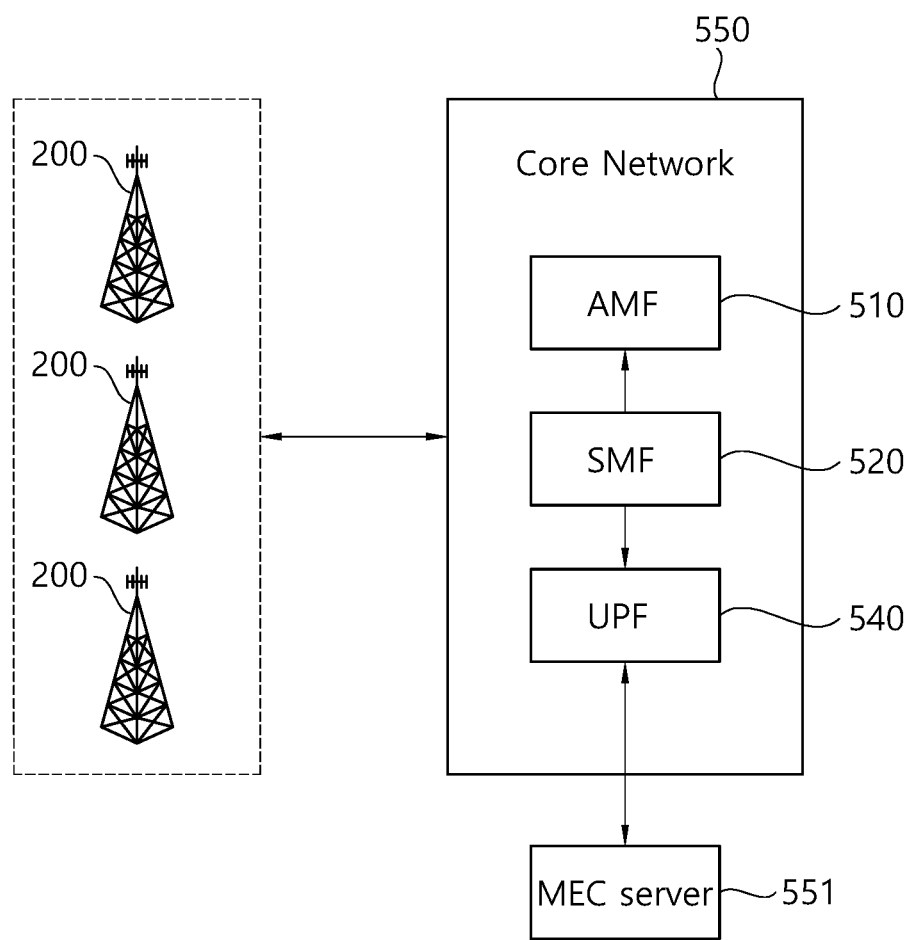

FIG. 5a illustrates an implementation example in which the MEC server 551 and the UPF node 540 are deployed together with the base station 200. FIG. 5b illustrates an implementation example in which the MEC server 551 is deployed together with a transmitting node (e.g., the UPF node 540). In FIG. 5b, the UPF node 540 and the MEC server 551 may communicate through a network aggregation point. FIG. 5c illustrates an implementation example in which the MEC server 551 and the UPF node 540 are deployed together with a network aggregation point. FIG. 5d illustrates an implementation example in which the MEC server 551 is deployed together with Core Network Functions (CPFs). In FIG. 5d, the MEC server 551 may be deployed in the same data center as the core network functions.

Embodiments of the Present Disclosure

Figure 6:
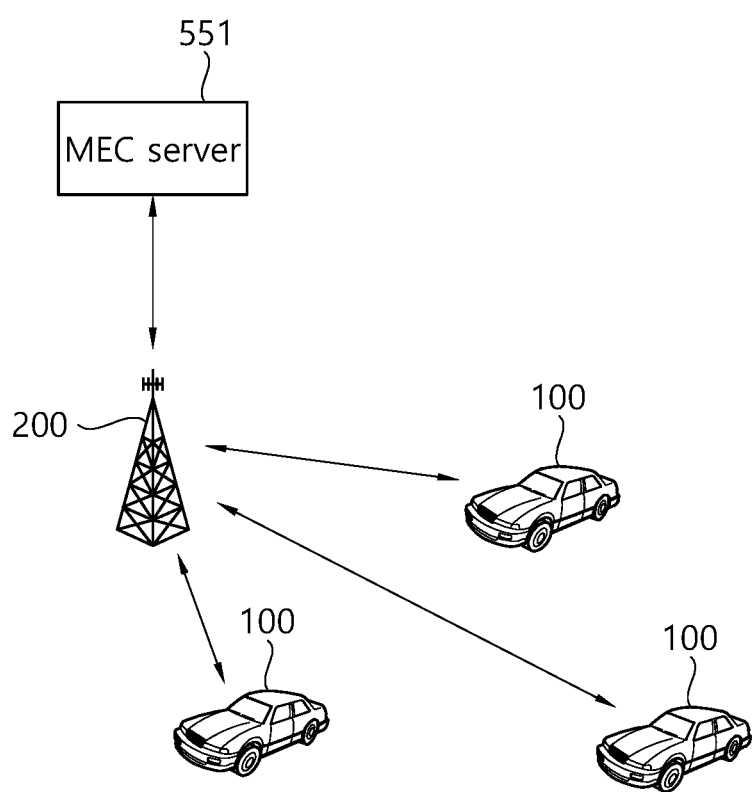
FIG. 6 illustrates an example in which a MEC server remotely controls a vehicle.

FIG. 6 illustrates an example in which a MEC server remotely controls a vehicle.

In FIG. 6, a MEC server 551, a base station 200, and a vehicle are shown. The base station 200 may be a gNB or an eNB. The base station 200 may be a base station including both a gNB and an eNB. The MEC server 551 may be connected to the base station 200 through wired communication or wireless communication. The MEC server 551 may transmit data to the base station 200 or may receive data from the base station 200. Although the drawing shows that the MEC server 551 and the base station 200 are directly connected, which is only for illustration, and the MEC server 551 may be connected to the base station 200 via another network node.

The base station 200 may transmit and receive data to and from a Telematics Communication Unit (TCU) 100 provided in the vehicle.

The TCU 100 may obtain state information from devices provided in the vehicle, and the state information may include various types of sensor data, video data, and the like. The TCU may transmit the state information to the base station 200, and the base station 200 may transmit the state information to the MEC server 551. Then, the MEC server 551 may transmit data for controlling the vehicle to the base station 200 based on the state information. When the base station 200 transmits the data for controlling the vehicle to the TCU 100, the TCU 100 may control the vehicle by transmitting the received data to the electronic devices provided in the vehicle. Further, the MEC server 551 may transmit map information to the base station 200, and the base station 200 may transmit the map information to the TCU. The TCU may control the vehicle using the map information.

The MEC server 551 and the TCU provided in the vehicle will be described in detail with reference to FIG. 7.

Figure 7:
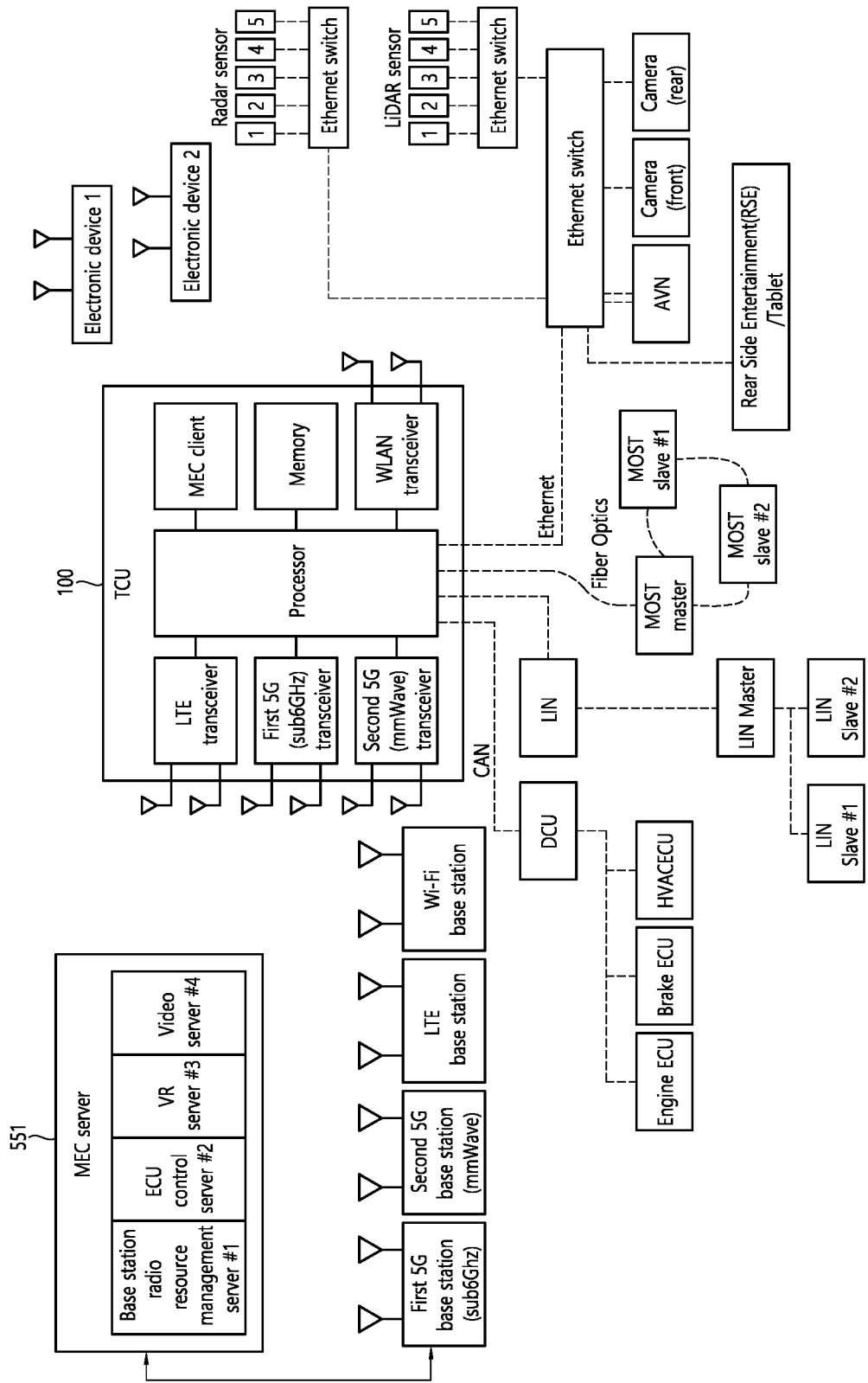
FIG. 7 is a block diagram illustrating an example of an MEC server and an example of a TCU according to an embodiment of the present disclosure.

FIG. 7 is a block diagram illustrating an example of an MEC server and an example of a TCU according to an embodiment of the present disclosure.

The MEC server is the MEC server 551 described with reference to FIG. 5a to FIG. 5d and FIG. 6 and will be described below with the reference numeral omitted.

The MEC server may be implemented as the examples described with reference to FIG. 5a to FIG. 5d. Although FIG. 7 shows that the MEC server communicates directly with the base stations, which is only for illustration, the MEC server may communicate with the base stations through another network node (e.g., a UPF node or a NEF). The MEC server may include a processor (not shown) and a memory (not shown). The memory may store an MEC server application. The processor may perform operations described in embodiments of the present disclosure using the MEC server application stored in the memory.

A first 5G base station (e.g., a 5G base station using sub-6 GHz) is a base station that performs communication based on a 5G standard in a Frequency Range 1 (FR1) band (a frequency band of 7125 MHz or less). A second 5G base station (e.g., a 5G base station using mmWave) is a base station that performs communication based on the 5G standard in a Frequency Range 2 (FR2) band (a frequency band of 24250 to 52600 MHz). An LTE base station performs communication based on an LTE standard. A Wi-Fi Access Point (AP) performs communication based on a Wi-Fi standard. The MEC server may communicate with the TCU using at least one of the first 5G base station (e.g., the 5G base station using sub-6 GHz), the second 5G base station (e.g., the 5G base station using mmWave), the LTE base station, and the Wi-Fi base station.

The TCU includes an LTE transceiver (i.e., an LTE modem/antenna), a first 5G transceiver (i.e., a modem/antenna using sub-6 GHz), a second 5G transceiver (i.e., a modem/antenna using mmWave), a WLAN transceiver (i.e., a Wi-Fi transceiver), a processor, and a memory. The LTE transceiver is a communication module that performs communication based on the LTE standard. The first 5G transceiver (i.e., the modem/antenna using sub-6 GHz) is a communication module that performs communication based on the 5G standard in the FR 1 band. The second 5G transceiver (i.e., the modem/antenna using mmWave) is a communication module that performs communication based on the 5G standard in the FR 2 band. The WLAN transceiver (i.e., the Wi-Fi transceiver) is a communication module that performs communication based on the Wi-Fi standard. The LTE transceiver, the first 5G transceiver (i.e., the modem/antenna using sub-6 GHz), the second 5G transceiver (i.e., the modem/antenna using mmWave), and the WLAN transceiver (i.e., the Wi-Fi transceiver) may be connected to the processor, e.g., through a PCI express (PCIe) interface. Although the LTE transceiver, the first 5G transceiver (i.e., the modem/antenna using sub-6 GHz), the second 5G transceiver (i.e., the modem/antenna using mmWave), and the WLAN transceiver (i.e., the Wi-Fi transceiver) are shown as separate entities, one communication module may perform functions of the LTE transceiver, the first 5G transceiver (i.e., the modem/antenna using sub-6 GHz), the second 5G transceiver (i.e., the modem/antenna using mmWave), and the WLAN transceiver (i.e., the Wi-Fi transceiver).

The processor of the TCU is connected to the first 5G transceiver (i.e., the modem/antenna using sub-6 GHz), the second 5G transceiver (i.e., the modem/antenna using mmWave), the WLAN transceiver (i.e., the Wi-Fi transceiver), and the memory. The memory may store a MEC client application. The processor may receive data transmitted by the base stations or UEs (UE 1 and UE 2) using the LTE transceiver, the first 5G transceiver (i.e., the modem/antenna using sub-6 GHz), the second 5G transceiver (i.e., the modem/antenna using mmWave), and the WLAN transceiver (i.e., the Wi-Fi transceiver). The processor may transmit data to the base stations or the UEs (UE 1 and UE 2) using the LTE transceiver, the first 5G transceiver (i.e., the modem/antenna using sub-6 GHz), the second 5G transceiver (i.e., the modem/antenna using mmWave), and the WLAN transceiver (i.e., the Wi-Fi transceiver). The UEs (UE 1 and UE 2) may be wireless communication devices used by a user in the vehicle.

The processor of the TCU may be connected to devices provided in the vehicle. For example, the processor may be connected to a Domain Control Unit (DCU), a Local Interconnect Network (LIN) master, a Media Oriented System Transport (MOST) master, and an Ethernet switch. The processor of the TCU may communicate with the DCU using a Controller Area Network (CAN) communication technology. The processor of the TCU may communicate with the LIN master using a LIN communication technology. The processor of the TCU may communicate with the MOST master connected by fiber optics using a MOST communication technology. The processor of the TCU may communicate with the Ethernet switch and devices connected to the Ethernet switch using an Ethernet communication technology.

The DCU is a device that controls a plurality of ECUs. The DCU may communicate with the plurality of ECUs using the CAN communication technology. Here, a CAN is a standard communication technology designed for microcontrollers or devices to communicate with each other in a vehicle. The CAN is a non-host-bus message-based network protocol mainly used for communication between controllers.

The DCU may communicate with an ECU, such as an engine ECU that controls an engine, a brake ECU that controls a brake, and an HVAC ECU that controls a Heating, Ventilation, and Air Conditioning (HVAC) device. The DCU may transmit data received from the processor of the TCU to each ECU. The DCU may transmit data received from each ECU to the processor of the TCU.

The LIN master may communicate with LIN slaves (LIN Slave #1 and LIN Slave #2) using the LIN communication technology. For example, LIN Slave #1 may be a slave that controls one of a steering wheel, a sunroof, a door, a seat, and a small motor. A LIN is a serial communication technology for communication between components in an automotive network. The LIN master may receive data from the processor of the TCU and may transmit the data to the LIN slaves (LIN Slave #1 and LIN Slave #2). The LIN master may transmit data received from the LIN slaves to the processor of the TCU.

The MOST master may communicate with MOST slaves (MOST Slave #1 and MOST Slave #2) using the MOST communication technology. MOST is a serial communication technology for transmitting audio, video, and control information using an optical cable. The MOST master may transmit data received from the processor of the TCU to the MOST slaves. The MOST master may transmit data received from the MOST slaves to the processor of the TCU.

Ethernet is a computer networking technology used in a Local Area Network (LAN), a Metropolitan Area Network (MAN), and a Wide Area Network (WAN). The processor of the TCU may transmit data to each device through the Ethernet switch using an Ethernet communication technology. Each device may transmit data to the processor of the TCU through the Ethernet switch using the Ethernet communication technology.

Radio detection and ranging (Radar) is a technology for measuring the distance, direction, angle, and speed of a target using radio waves. Radar sensors 1 to 5 are provided in the vehicle to measure the distance, direction, angle, and speed of an object around the vehicle. Radar sensors 1 to 5 may transmit measured sensor data to the processor of the TCU.

Light detection and ranging (LiDAR) is a sensing technology for detecting a remote object and measuring the distance thereof using a light source and a receiver. Specifically, lidar is a technology for measuring the distance, strength, speed, and the like of a target by illuminating the target with a pulsed laser beam and measuring a pulse reflected by a sensor. Lidar sensors 1 to 5 measure the distance, speed, and the like of a target. Lidar sensors 1 to 5 may transmit measured sensor data to the processor of the TCU.

An Audio Video Navigation (AVN) is a device provided in the vehicle to provide a sound, a video, and a navigation function. The AVN may receive data from the processor of the TCU using an Ethernet communication technology and may provide a sound, a video, and a navigation function based on the received data. The AVN may transmit data to the processor of the TCU using the Ethernet communication technology.

A camera (front) and a camera (rear) may capture an image at the front and rear of the vehicle. Although FIG. 7 shows that there are one camera in the front and one camera in the rear, which is only for illustration, cameras may also be provided on the left and right sides. In addition, a plurality of cameras may be provided in each of the front and rear. The cameras may transmit camera data to the processor of the TCU and may receive data from the processor of the TCU using the Ethernet communication technology.

A Rear Seat Entertainment (RSE) refers to a rear seat entertainment system. The RSE is a device mounted behind a passenger seat or behind a driver's seat in the vehicle and provides entertainment for an occupant. A tablet may also be provided in the vehicle. The RSE or tablet may receive data from the processor of the TCU and may transmit data to the processor of the TCU using the Ethernet communication technology.

The MEC server according to an embodiment of the present disclosure may perform a function of receiving/storing/transmitting/analyzing various types of data, such as video/audio/sensor data, which is performed in a conventional cloud server, and a function of managing the TCU and the devices provided in the vehicle.

In the MEC server according to an embodiment of the present disclosure, there may be a MEC server application for performing operations according to various purposes. The MEC server may perform the following functions using the MEC server application.

To comply with regulations, such as the Road Traffic Act, ISO26262 (standard for industrial safety, Road vehicles-Functional safety), or System Architecture Evolution (SAE) standards, the MEC server may monitor operations of the TCU and the ECU in the vehicle. When the operations of the TCU and the ECU in the vehicle violate the regulations, the MEC server controls the operation of the ECU in the vehicle based on a predefined scenario.

The MEC server may perform functions to analyze information on the vehicle (e.g., state information on the devices provided in the vehicle, such as engine ECU-related data, Revolutions Per Minute (RPM) ECU-related data, wheel-related data, brake-related data, and HVAC-related data) received from the TCU in the vehicle and to control the operation of an in-vehicle device connected to the TCU based on a predefined scenario.

The MEC server may monitor the operating state of the TCU and may determine the current state of the TCU. For example, the MEC server may monitor the operating state of the TCU and may determine the current state of the TUC as one of inactive, active, sleeping, and moving states.

The MEC server may receive information on the vehicle (e.g., information on the position of the vehicle) from the TCU and may manage (e.g., collect/analyze/control/record) the position of the vehicle.

The MEC server may receive information on the vehicle (e.g., information on the speed of the vehicle) from the TCU and may manage (e.g., collect/analyze/control/record) the information on the speed of the vehicle. The MEC server may manage the information on the speed of the vehicle to determine whether the vehicle drives too fast, whether the vehicle complies with a safety speed, and the like.

The MEC server may receive information on the vehicle (e.g., engine ECU information) from the TCU and may manage (e.g., collect/analyze/control/record) the engine ECU (engine-controlling ECU) information.

The MEC server may receive information on the vehicle (e.g., information received from the sensors and cameras provided in the vehicle) from the TCU and may manage (e.g., collect/analyze/control/record) vehicular sensor and camera (LiDAR, Radar, and front/rear/measurement/cabin cameras) information.

When the result of analyzing the vehicular sensor and camera information indicates that a collision of the vehicle with a pedestrian, an obstacle, or the like is expected to occur, the MEC server may transmit control data to the TCU based on an emergency response scenario, thereby controlling the ECU (the engine ECU, the brake ECU, and the like) in the vehicle.

Figure 8:
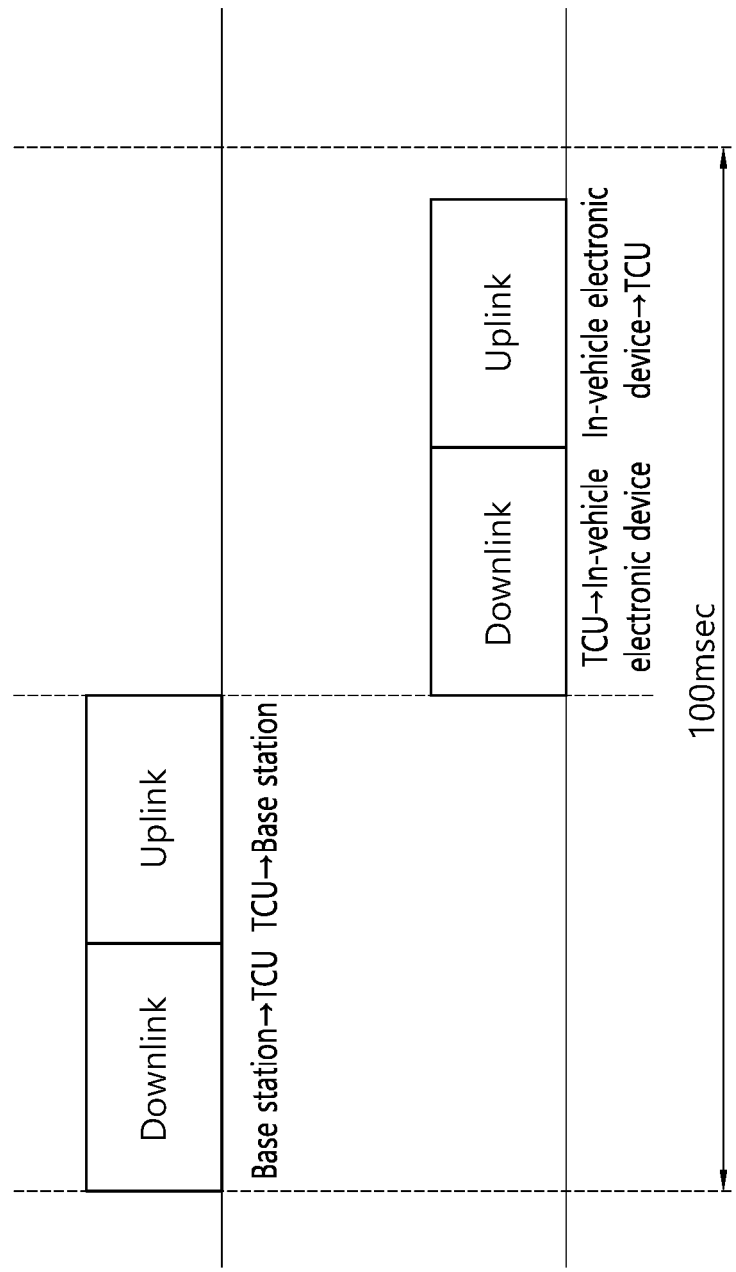
FIG. 8 illustrates an example in which a TCU performs data transmission and reception according to an embodiment of the present disclosure.
Figure 9:
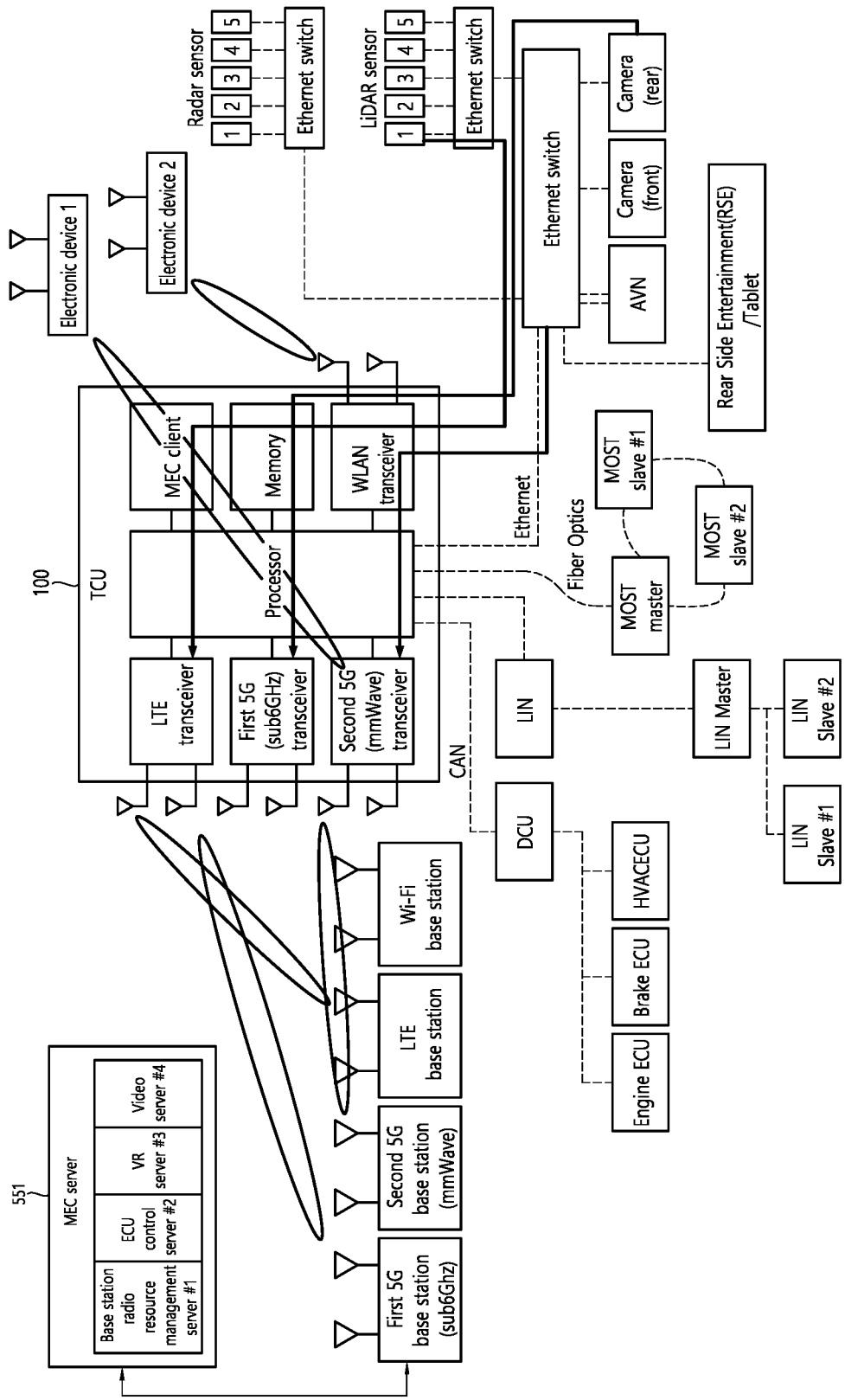
FIG. 9 illustrates transmission and reception paths for the example illustrated in FIG. 8.

FIG. 8 illustrates an example in which a TCU performs data transmission and reception according to an embodiment of the present disclosure. FIG. 9 illustrates transmission and reception paths for the example illustrated in FIG. 8.

According to an embodiment of the present disclosure, communication between a base station and the TCU is performed in a first time period, and communication between the TCU and an in-vehicle electronic device is performed in a second time interval.

Specifically, the base station transmits a plurality of pieces of downlink data to the TCU in a downlink period within the first time period, and the TCU transmits uplink data to the base station in an uplink period within the first time period. And, the TCU transmits downlink data to the in-vehicle electronic device in a downlink period within the second time period, and the in-vehicle electronic device transmits uplink data to the TCU in an uplink period within the second time period.

During the downlink period within the first time period, the TCU simultaneously receives data from a MEC server through base stations using a first 5G transceiver (i.e., a modem/antenna using sub-6 GHz), a second 5G transceiver (i.e., a modem/antenna using mmWave), and an LTE transceiver (i.e., an LTE modem/antenna), and copies the data from a memory in each TCU into a buffer.

Subsequently, during the downlink period within the second time period, the TCU simultaneously transmits the buffered data at 500 Mbps or higher using at least one of a plurality of communication methods (e.g., LTE communication, 5G communication, WLAN communication, and direct communication), based on a data rate requested by each of a plurality of in-vehicle electronic devices.

As illustrated in FIG. 9, the communication between the base station and the TCU may be performed using at least one of a plurality of communication methods (e.g., LTE communication, 5G communication, and WLAN communication).

The communication between the TCU and the in-vehicle electronic device may be performed using at least one of a plurality of communication methods (e.g., 5G communication, WLAN communication, and wired communication).

For example, image data from a rear camera may be transmitted to the TCU through wired communication (e.g., the Ethernet switch).

Figure 10:
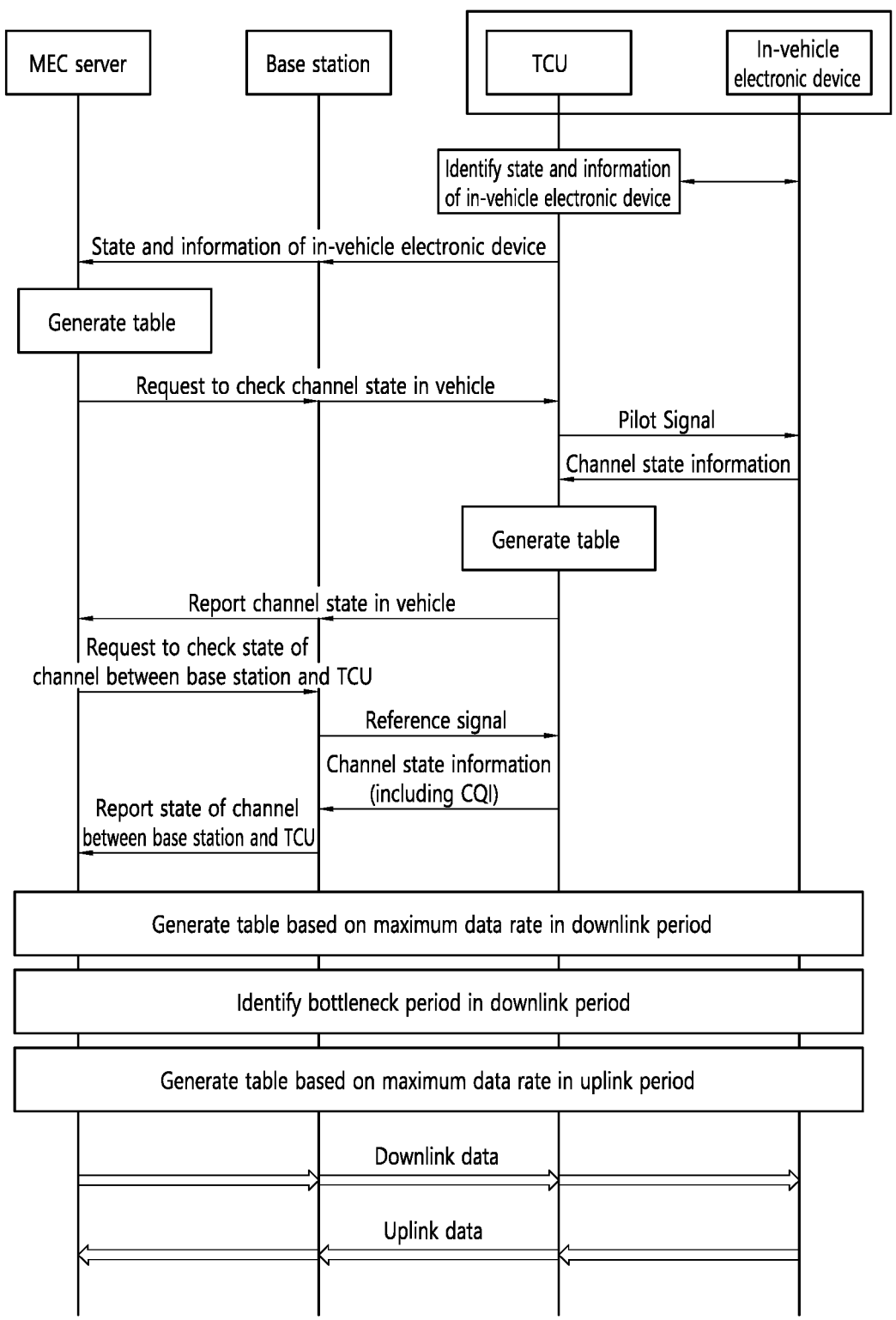
FIG. 10 illustrates a procedure for a method according to an embodiment of the present disclosure.

FIG. 10 illustrates a procedure for a method according to an embodiment of the present disclosure.

Referring to FIG. 10, a MEC client in a TCU identifies states and information of all electronic devices connected to the TCU. Here, the TCU may identify an available buffer size that can be used for a buffer in the size of a memory in the TCU.

Specifically, the MEC client in the TCU may identify the data transmission capabilities of the electronic devices. For example, the MEC client in the TCU may check whether 10 gigabit Ethernet communication is possible and whether WLAN communication supports 866 Mbps or 1.3 Gbps.

All electronic devices connected to the TCU may include, e.g., a DCU, an ECU, and a LIN connected through CAN communication. The electronic devices may also include a LIN. The electronic devices may include a MOST connected via an optical cable. In addition, the electronic devices may include a Radar sensor, a LiDAR sensor, an AVN, a camera, and an RSE connected via an Ethernet switch. Furthermore, the electronic devices may include an electronic device connected by a wireless method (e.g., a WLAN).

The MEC client in the TCU may transmit the foregoing collected information to a MEC server through a base station. Accordingly, the MEC server may know the available buffer size that can be used for the buffer in the size of the memory in the TCU. The MEC server may identify the data transmission capability of each in-vehicle electronic device. In addition, the MEC server may identify information on a pair of a reception (Rx) antenna of the TCU and a transmission (Tx) antenna of the TCU.

The MEC server generates a table based on the received information.

TABLE 1

| In-vehicle electronic device | Communication type | TAG | Transmission priority | Data rate |
| --- | --- | --- | --- | --- |
| ECU | CAN | RPM | 1 | 2 Mbps |
| ECU | CAN | Brake | 2 | 2 Mbps |
| ECU | CAN | HVAC | 3 | 2 Mbps |
| ECU | LIN | Heating wire | 4 | 1 Mbps |
| ECU | LIN | Wheel | 5 | 1 Mbps |
| ECU | Flexray | Body Control Unit | 6 | 10 Mbps |
| ECU | MOST | Audio | 7 | 100 Mbps |
| Camera | Ethernet | Front 1 | 8 | 1 Gbps |
| Camera | Ethernet | Front 2 | 9 | 1 Gbps |
| Camera | Ethernet | Front 3 | 10 | 1 Gbps |
| Camera | Ethernet | Front 4 | 11 | 1 Gbps |
| Camera | Ethernet | Rear 1 | 12 | 1 Gbps |
| Camera | Ethernet | Rear 2 | 13 | 1 Gbps |
| Camera | Ethernet | Rear 3 | 14 | 1 Gbps |
| Camera | Ethernet | Rear 4 | 15 | 1 Gbps |
| Camera | Ethernet | Side (left) 1 | 16 | 1 Gbps |
| Camera | Ethernet | Side (left) 2 | 17 | 1 Gbps |
| Camera | Ethernet | Side (right) 1 | 18 | 1 Gbps |
| Camera | Ethernet | Side (right) 2 | 19 | 1 Gbps |
| Radar | CAN | Front (short) | 20 | 2 Gbps |
| Radar | Ethernet | Front (short) | 21 | 1 Gbps |
| Radar | CAN | Rear (short) | 22 | 2 Gbps |
| Radar | Ethernet | Rear (short) | 23 | 1 Gbps |
| Lidar | Ethernet | Front (short) | 24 | 1 Gbps |
| Lidar | CAN | Rear (long) | 25 | 100 Mbps |
| ECU | Ethernet | Voice | 26 | 1 Gbps |
| ECU | Ethernet | 4K AR | 27 | 1 Gbps |
| ECU | Ethernet | 4K VR | 28 | 1 Gbps |
| ECU | Ethernet | 8K AR | 29 | 1 Gbps |
| ECU | Ethernet | 8K VR | 30 | 1 Gbps |
| ECU | Ethernet | 4K Video | 31 | 1 Gbps |
| ECU | Ethernet | 8K Video | 32 | 1 Gbps |

A MEC radio resource management server in the MEC server transmits a request to check the state of a channel with the in-vehicle electronic devices to the TCU.

The TCU transmits a pilot signal, and each of the in-vehicle electronic devices feeds back channel state information, e.g., a Channel Quality Indicator (CQI).

Further, the TCU may feed back the information on the pair of the reception (Rx) antenna of the TCU and the transmission (Tx) antenna of the TCU.

The TCU calculates a data rate with respect to each in-vehicle electronic device based on the received channel state information. In wireless communication, the data rate may be calculated for each antenna beam.

TABLE 2

| Antenna type | Antenna number | Data rate |
| --- | --- | --- |
| 5G mmWave | 1 | 2 Gbps |
| 5G mmWave | 2 | 2 Gbps |
| 5G mmWave | 3 | 2 Gbps |
| 5G mmWave | 4 | 2 Gbps |
| 5G mmWave | 5 | 3 Gbps |
| 5G mmWave | 6 | 3 Gbps |
| 5G mmWave | 7 | 3 Gbps |
| 5G mmWave | 8 | 3 Gbps |
| 5G sub-6 Ghz | 9 | 1 Gbps |
| 5G sub-6 Ghz | 10 | 1 Gbps |
| 5G sub-6 Ghz | 11 | 1 Gbps |
| 5G sub-6 Ghz | 12 | 1 Gbps |
| LTE | 13 | 30 Mbps |
| LTE | 14 | 30 Mbps |
| LTE | 15 | 30 Mbps |
| LTE | 16 | 30 Mbps |
| Wi-Fi | 17 | 200 Mbps |
| Wi-Fi | 18 | 200 Mbps |
| Wi-Fi | 19 | 200 Mbps |

TABLE 2-continued

| Antenna type | Antenna number | Data rate |
| --- | --- | --- |
| Wi-Fi | 20 | 200 Mbps |

The TCU transmits an in-vehicle channel state report to the MEC server via the base station. The in-vehicle channel state report transmitted to the MEC server may include information on the data rate calculated for each antenna beam. The information may be illustrated as in Table 2 above.

The MEC server transmits a request to check the state of a channel between the base station and the TCU to the base station.

Then, the base station transmits a reference signal to the TCU. The base station may include an LTE base station, a first 5G base station, and a second 5G base station. Therefore, the reference signal may be transmitted from each of the LTE base station, the first 5G base station, and the second 5G base station.

The TCU feeds back the channel state information, e.g., the CQI, to the base station based on the received reference signal. The channel state information may be transmitted to the LTE base station, the first 5G base station, and the second 5G base station.

The base station may transmit, to the MEC server, a report on the state of the channel between the base station and the TCU generated based on the channel state information received from the TCU.

The MEC server calculates a maximum data rate for downlink transmission in each period based on the in-vehicle channel state report and the report on the state of the channel between the base station and the TCU, and generates a downlink table accordingly.

A downlink data rate for each antenna between the base station and the TCU may be as illustrated in the following table.

TABLE 3

| Antenna type | Antenna number | Data rate |
| --- | --- | --- |
| 5G mmWave | 1 | 1 Gbps |
| 5G mmWave | 2 | 1 Gbps |
| 5G mmWave | 3 | 1 Gbps |
| 5G mmWave | 4 | 1 Gbps |
| 5G mmWave | 5 | 2 Gbps |
| 5G mmWave | 6 | 2 Gbps |
| 5G mmWave | 7 | 3 Gbps |
| 5G mmWave | 8 | 3 Gbps |
| 5G sub-6 Ghz | 9 | 500 Mbps |
| 5G sub-6 Ghz | 10 | 500 Mbps |
| 5G sub-6 Ghz | 11 | 1 Gbps |
| 5G sub-6 Ghz | 12 | 1 Gbps |
| LTE | 13 | 20 Mbps |
| LTE | 14 | 20 Mbps |
| LTE | 15 | 20 Mbps |
| LTE | 16 | 20 Mbps |
| Wi-Fi | 17 | 100 Mbps |
| Wi-Fi | 18 | 100 Mbps |
| Wi-Fi | 19 | 100 Mbps |
| Wi-Fi | 20 | 100 Mbps |

The MEC server identifies a period in which a bottleneck occurs in a downlink period. To this end, the MEC server may generate a data rate according to the pair of the reception (Rx) antenna of the TCU and the transmission (Tx) antenna of the TCU as illustrated in the table below. The reception (Rx) antenna is an antenna for the TCU to receive downlink data from the base station. The transmission (Tx) antenna is an antenna for the TCU to transmit downlink data to an in-vehicle electronic device.

TABLE 4

| Number of Rx antenna of TCU | Number of Tx antenna of TCU | Data rate |
| --- | --- | --- |
| 1 | 20 | 200 Mbps |
| 2 | 19 | 200 Mbps |
| 3 | 18 | 200 Mbps |
| 4 | 17 | 200 Mbps |
| 5 | 16 | 30 Mbps |
| 6 | 15 | 30 Mbps |
| 7 | 14 | 30 Mbps |
| 8 | 13 | 30 Mbps |
| 9 | 12 | 500 Mbps |
| 10 | 11 | 500 Mbps |
| 11 | 10 | 1 Gbps |
| 12 | 9 | 1 Gbps |
| 13 | 8 | 20 Mbps |
| 14 | 7 | 20 Mbps |
| 15 | 6 | 20 Mbps |
| 16 | 5 | 20 Mbps |
| 17 | 4 | 100 Mbps |
| 18 | 3 | 100 Mbps |
| 19 | 2 | 100 Mbps |
| 20 | 1 | 100 Mbps |

Likewise, the MEC server and the TCU calculate a maximum data rate in an uplink period and generate an uplink table accordingly. In addition, the MEC server and the TCU identify a period in which a bottleneck occurs in the uplink period.

The TCU may calculate an available buffer size as described below in order to identify the bottleneck period in the downlink period and the bottleneck period in the uplink period.

Figure 11A:
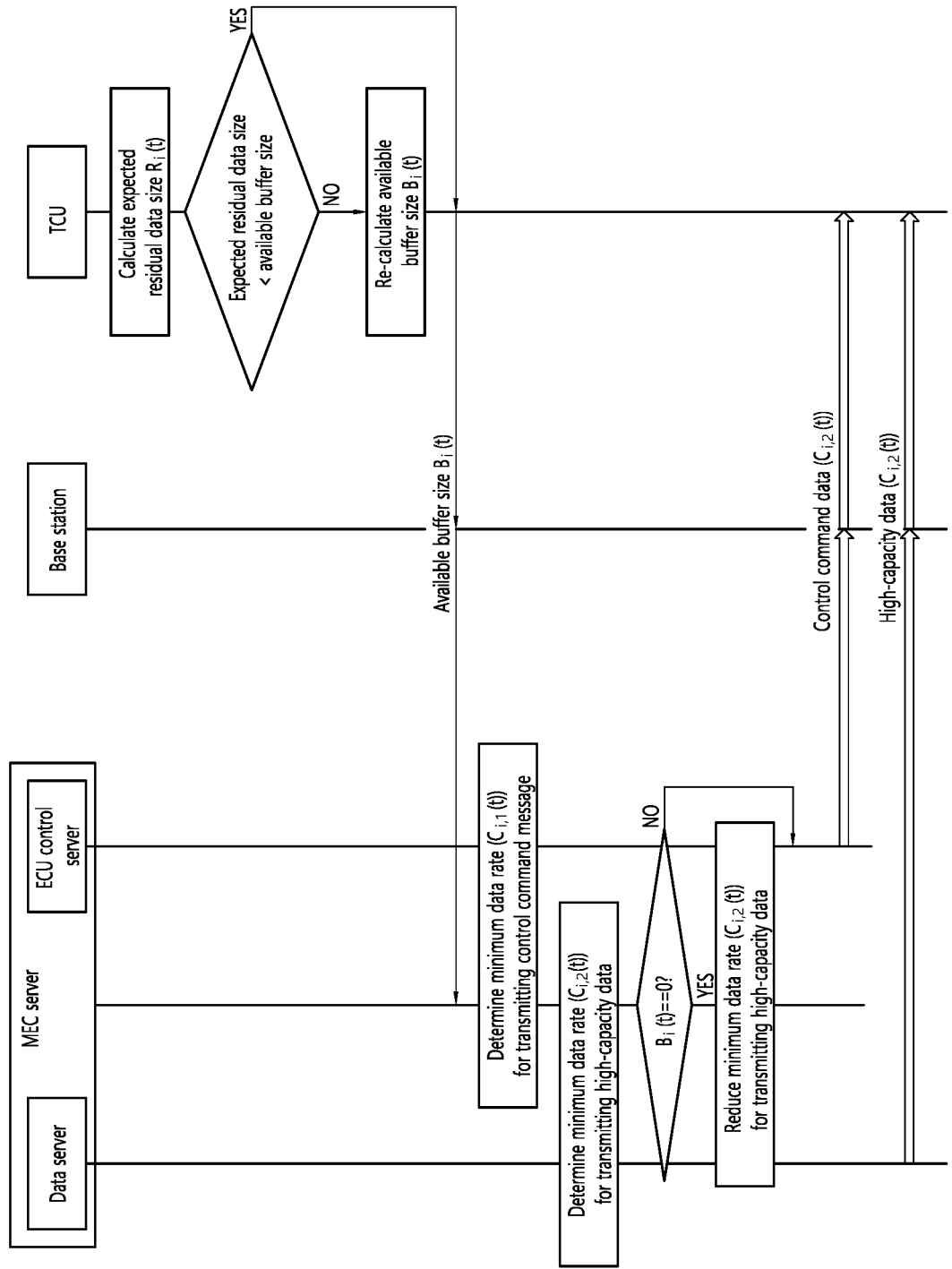
FIG. 11a and FIG. 11b illustrate a method for calculating the size of an available buffer in a TCU.
Figure 11B:
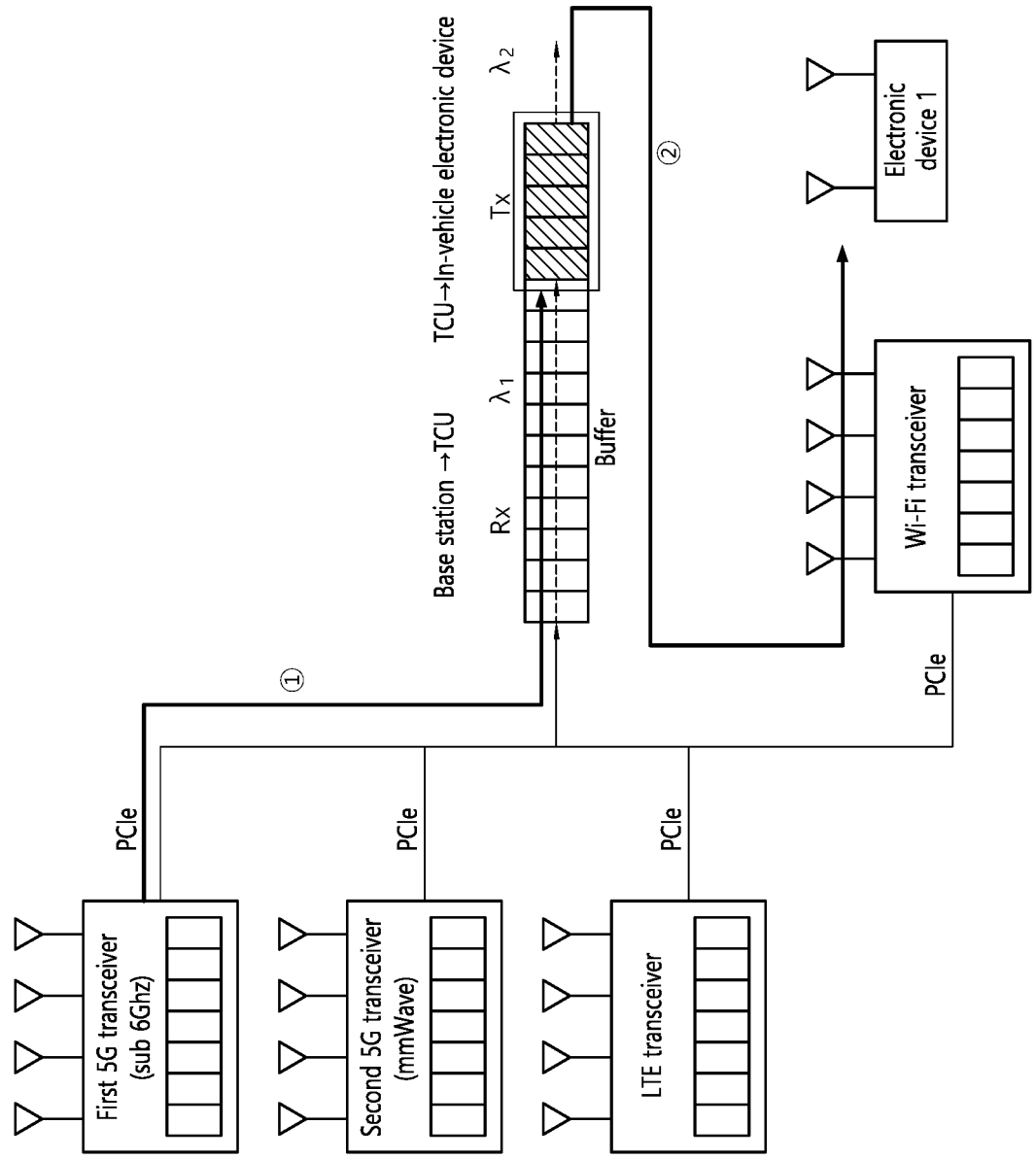

FIG. 11a and FIG. 11b illustrate a method for calculating the size of an available buffer in a TCU.

Referring to FIG. 11a, the TCU calculates an expected residual data size $R_i(t)$ in the buffer according to Equation 1.

$$R_i(t) = \lambda_1 \cdot e^{-\lambda_1 \cdot t} - \lambda_2 \cdot e^{-\lambda_2 \cdot t} \quad \text{[Equation 1]}$$

Here, $\lambda_1$ denotes an input data rate, and $\lambda_2$ denotes an output data rate. T denotes time. The time may be in seconds.

For example, as illustrated in FIG. 11b, it is assumed that downlink data is received from a base station through a first 5G transceiver. In this case, the first 5G transceiver stores the downlink data received from the base station in a buffer memory thereof and then copies the downlink data into a buffer memory in the TCU at a rate of $\lambda_1$. The TCU determines an electronic device to which the downlink data is to be transmitted. The TCU selects a communication method (i.e., LTE communication, 5G communication, WLAN communication, or Ethernet communication) with the determined electronic device. When the communication method is selected, the TCU copies the downlink data into a buffer memory in a transceiver corresponding to the communication method at a rate of $\lambda_2$. The TCU controls the transceiver to transmit the downlink data by selecting a specific antenna beam. For example, $\lambda_2$ may be a minimum data rate for each in-vehicle electronic device. For example, the minimum data rate may be listed as follows.

TABLE 5

| Data type | Service number | Data rate |
| --- | --- | --- |
| 4K VR | 1 | 1 Gbps |
| 4K AR | 2 | 1 Gbps |
| 8K Video | 3 | 2 Gbps |
| ECU(RPM) | 4 | 10 Mbps |
| ECU(BRAKE) | 5 | 10 Mbps |
| LIN(wheel) | 6 | 1 Mbps |

The TCU selects an antenna beam supporting a transmission data rate greater than $\lambda_2$ among a plurality of antennas.

Referring back to FIG. 11a, the TCU may determine whether the calculated expected residual data size $R_i(t)$ in the buffer is less than an available buffer size $B_i(t)$ as illustrated in Equation 2.

When the calculated expected residual data size $R_i(t)$ in the buffer is not less than the available buffer size $B_i(t)$, the TCU re-calculates the available buffer size $B_i(t)$ according to Equation 2.

$$B_i(t) = B_i(t) - R_i(t) \quad \text{[Equation 2]}$$

The TCU transmits information on the available buffer size $B_i(t)$ to a MEC server.

An ECU control server in the MEC server determines a minimum data rate $(C_{i,1}(t))$ for transmitting a control command message.

A data server in the MEC server determines a minimum data rate $(C_{i,2}(t))$ for transmitting high-capacity data.

When the available buffer size $B_i(t)$ received from the TCU is 0, the MEC server reduces the minimum data rate $(C_{i,2}(t))$ for high-capacity data. For example, the data server in the MEC server may reduce a data rate for each service. That is, when a bottleneck occurs because the available buffer size is not sufficient, the MEC server may reduce the data rate.

The ECU control server in the MEC server may transmit a control command message, and the data server may transmit high-capacity data.

Figure 12A:
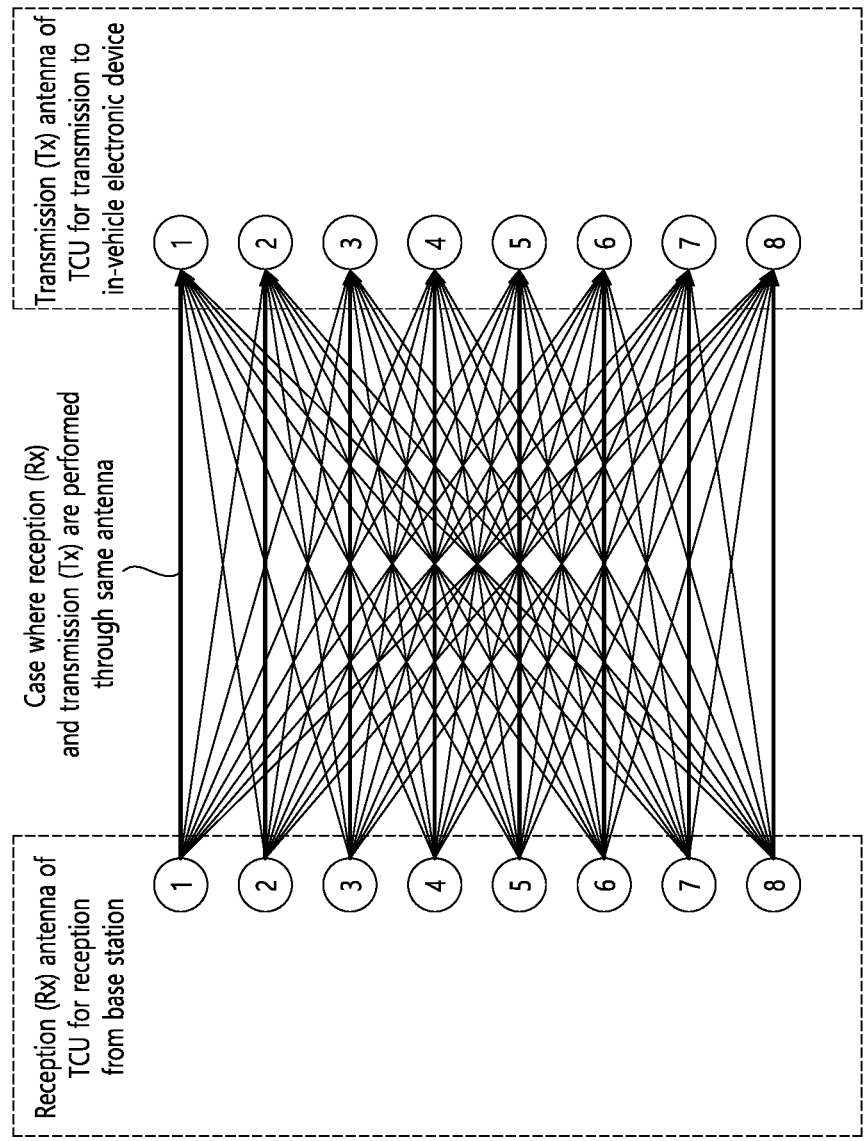
FIG. 12a illustrates an example of a combination of antenna pairs.
Figure 12B:
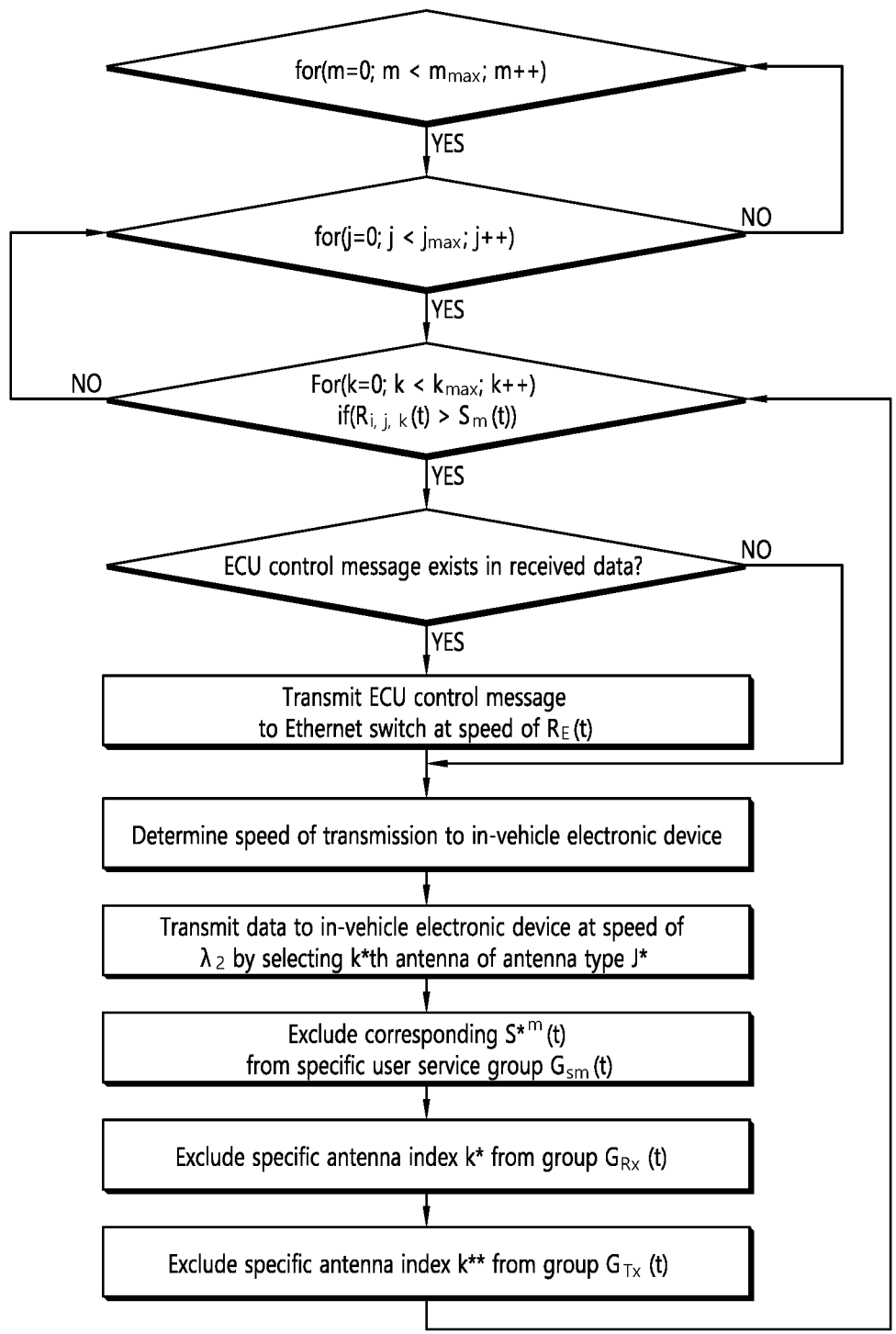
FIG. 12b illustrates an example of a method for determining a combination of antenna pairs.

FIG. 12a illustrates an example of a combination of antenna pairs, and FIG. 12b illustrates an example of a method for determining a combination of antenna pairs.

Left numbers shown in FIG. 12a are index numbers of reception (Rx) antennas of a TCU for receiving downlink data from a base station. Left numbers shown in FIG. 12a are index numbers of transmission (Tx) antennas of the TCU for transmitting downlink data to an in-vehicle electronic device.

When reception (Rx) and transmission (Tx) are performed through the same antenna, i.e., when the index of a reception (Rx) antenna and the index of a transmission (Tx) antenna are the same, as illustrated in FIG. 8, the TCU receives downlink data from the base station through the antenna in a downlink period within a first time period and transmits the downlink data to the in-vehicle electronic device through the antenna in a downlink period within a second time period.

In this case, a data rate $R_{i,j}(t)$ may be obtained as follows.

$$R_{i,j,k}(t) = R_{i,j,k}(t) - R_E(t) \quad \text{[Equation 3]}$$

The method for determining the combination of antenna pairs illustrated in FIG. 12b may be performed for each service. That is, the method may be performed by increasing a service index m until reaching the maximum number $m_{max}$ of services. To this end, a for function may be used. m is increased from 0.

Further, the method illustrated in FIG. 12b may be performed for each antenna type.

The antenna type may include an antenna for LTE, an antenna for first 5G communication (i.e., communication using sub-6 GHz), and an antenna for second 5G communication (i.e., communication using mmWave). The method may be performed by increasing an antenna type index j until reaching the maximum number $j_{max}$ of antenna types. To this end, a for function may be used. j is increased from 0.

In addition, the method shown in FIG. 12b may be performed for each antenna. The method may be performed by increasing an antenna index k until reaching the maximum number $k_{max}$ of antennas. To this end, a for function may be used. k is increased from 0. Here, the method is performed when the data rate $R_{i,j,k}(t)$ is greater than $S_m(t)$ of a specific service.

When an ECU control message exists in the data received by the TCU from the base station, the TCU transmits the ECU control message to an Ethernet switch at a speed of $R_{E(t)}$.

Then, the data rate $R_{i,j,k}(t)$ is determined as follows.

$$R_{i,j,k}(t) = R_{i,j,k}(t) - R_E(t) \quad \text{[Equation 4]}$$

Subsequently, the TCU determines the speed of transmission to the in-vehicle electronic device according to the following Equation.

$$\lambda_2 = \text{Min}(R_{i,j,k}(t), T_{i,j,k}(t)) \quad \text{[Equation 5]}$$

In the above equation, symbols are defined as follows.
i: Index of TCU-i
j: Antenna type index
k: Antenna index
m: Service index
$S_{i,j,k}(t)$: Data rate for service required by user.
$R_E(t)$: Data rate of ECU control message that TCU transmits to ECU
$G_{Sm}(t)$: Service group of specific user
$G_{Rx}(t)$: Reception antenna beam group of TCU for reception from base station
$G_{Tx}(t)$: Transmission antenna beam group of TCU for transmission to in-vehicle electronic device Next, the TCU may select a k*th antenna of an antenna type J* and transmit data to the in-vehicle electronic device at a speed of $\lambda_2$.

The TCU excludes corresponding $S^{*m}(t)$ from a specific user service group $G_{sm}(t)$.

The TCU excludes a specific antenna index k* from a group $G_{Rx}(t)$.

The TCU excludes a specific antenna index k** from a group $G_{Tx}(t)$.

As described above, according to an embodiment of the present disclosure, when a MEC server transmits various types of data to an in-vehicle device, such as an ECU, a RSE, and an AVN, through a TCU, the MEC server may select a reception (Rx) antenna type of the TCU (i.e., LTE or 5G) and a reception antenna beam. Further, the MEC server may adjust the transmission speed of downlink data according to the size of an available buffer in the TCU. Here, the MEC server may adjust the transmission speed inside the TCU so that an ECU control message can be transmitted with the highest priority.

According to an embodiment of the present disclosure, when the TCU stores data flowing through a plurality of transceivers (i.e., an LTE transceiver, a first 5G transceiver, a second 5G transceiver, and a WLAN transceiver) in the buffer before transmitting the data to the in-vehicle electronic device, the TCU may control the size of the data not to exceed the buffer size. To this end, the MEC server may adjust the rate of data transmitted to the TCU through a base station.

In the foregoing illustrative system, although the methods are explained based on flowcharts including a series of steps or blocks, the present disclosure is not limited to the order of steps, and a certain step may be performed in order or step different from that described above or may be performed concurrently with another step. Further, it may be understood by a person having ordinary skill in the art that steps shown in a flowchart are not exclusive and that another step may be incorporated or one or more steps of the flowchart may be removed without departing from the scope of the present disclosure.

Figure 13:
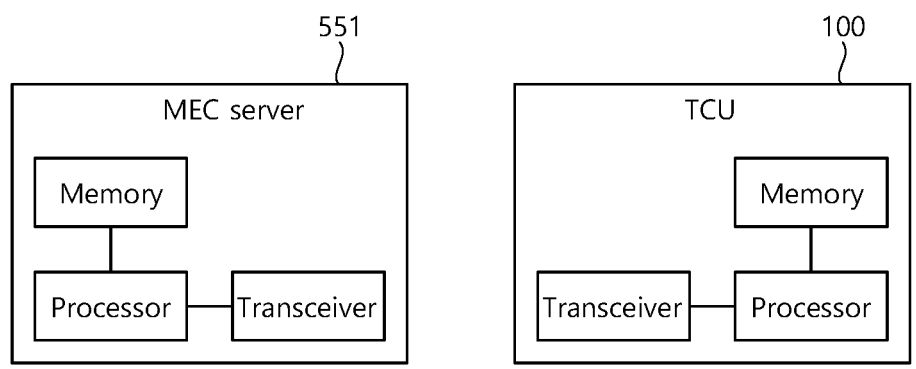
FIG. 13 is a block diagram illustrating the implementation of an MEC server and a TCU according to an embodiment.

FIG. 13 is a block diagram illustrating the implementation of an MEC server and a TCU according to an embodiment.

Referring to FIG. 13, each of the MEC server 551 and the TCU 100 may include a memory, a processor, and a transceiver.

The illustrated processor, memory, and transceiver may be implemented as separate chips, or at least two blocks/functions may be implemented through one chip.

The transceiver includes a transmitter and a receiver. When a specific operation is performed, only one of the operations of the transmitter and the receiver may be performed, or both of the operations of the transmitter and the receiver may be performed. The transceiver may include at least one antenna for transmitting and/or receiving a radio signal. In addition, the transceiver may include an amplifier for amplifying a reception signal and/or a transmission signal and a band-pass filter for transmission in a specific frequency band.

As described above, the transceiver of the TCU may include a first 5G transceiver (i.e., a modem/antenna using sub-6 GHz), a second 5G transceiver (i.e., a modem/antenna using mmWave), and an LTE transceiver (i.e., an LTE modem/antenna using LTE).

The processor may implement the functions, procedures, and/or methods proposed in the present disclosure. The processor may include an encoder and a decoder. For example, the processor may perform an operation according to the above description. The processor may include an Application-Specific Integrated Circuit (ASIC), a different chipset, a logic circuit, a data processing device, and/or a converter to convert a baseband signal and a radio signal into each other.

The memory may include a Read-Only Memory (ROM), a Random-Access Memory (RAM), a flash memory, a memory card, a storage medium, and/or other storage devices.

Figure 14:
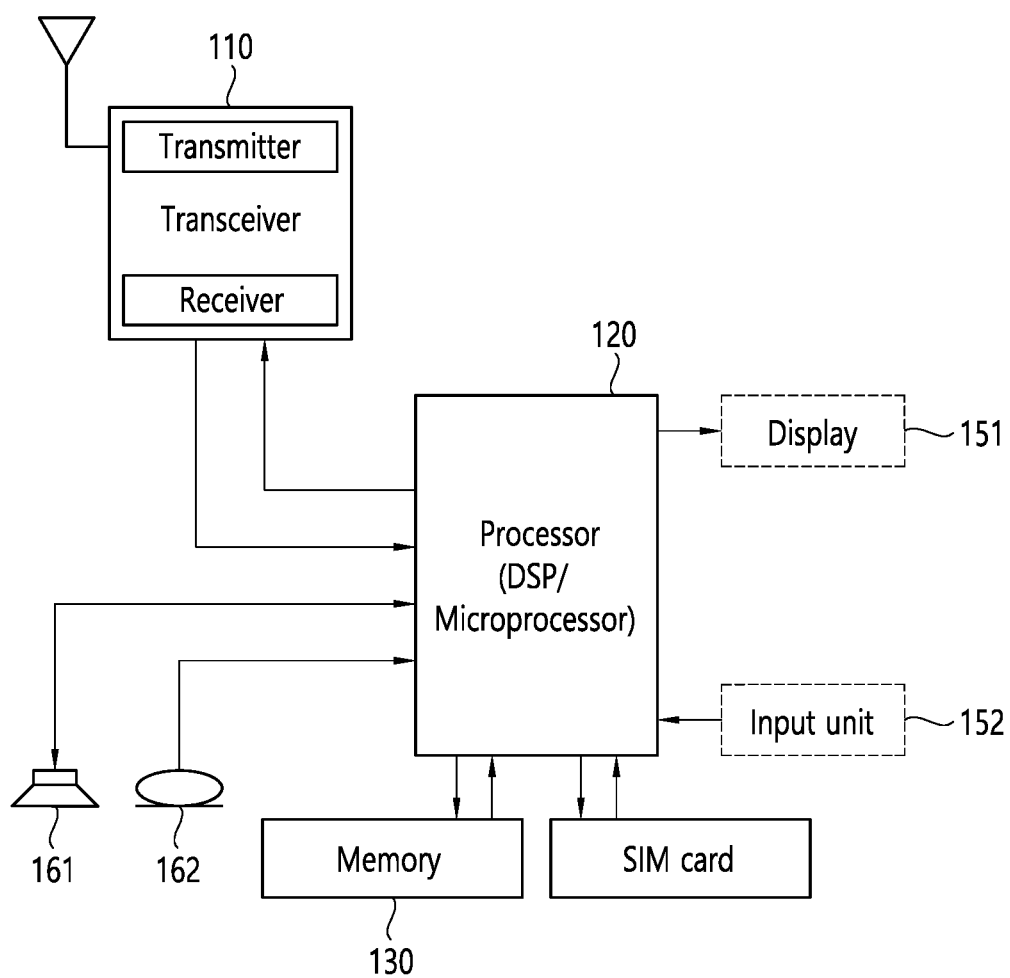
FIG. 14 is a block diagram illustrating an implementation of a TCU in detail according to an embodiment of the present disclosure.

FIG. 14 is a block diagram illustrating an implementation of a TCU in detail according to an embodiment of the present disclosure.

The illustrated TCU 100 includes a transceiver 110, a processor 120, a memory 130, at least one more antenna, and a Subscriber Identification Module (SIM) card.

The illustrated TCU 100 may further include a speaker 161 and a microphone 162 as necessary.

The illustrated TCU 100 may further include a display 151 and an input unit 152 as necessary.

The processor 120 may be configured to implement the proposed functions, procedures and/or methods described in the present disclosure. Layers of a radio interface protocol may be implemented in the processor 120. The processor 120 may include an Application-Specific Integrated Circuit (ASIC), a different chipset, a logic circuit, and/or a data processing device. The processor 120 may be an Application Processor (AP). The processor 120 may include at least one of a Digital Signal Processor (DSP), a Central Processing Unit (CPU), a Graphics Processing Unit (GPU), and a modem (modulator and demodulator). Examples of the processor 120 may include SNAPDRAGON™ series processors made by Qualcomm®, EXYNOS™ series processors made by Samsung®, A series processors made by Apple®, HELIO™ series processors made by MediaTek®, ATOM™ series processors made by Intel®, or a corresponding next-generation processor.

The display 151 outputs the result of processing by the processor 120. The input unit 152 receives an input to be used by the processor 120. The input unit 152 may be displayed on the display 151. The SIM card is an integrated circuit used to securely store an International Mobile Subscriber Identity (IMSI) and an associated key used to identify and authenticate a subscriber in a mobile phone device, such as a mobile phone and a computer. The SIM card may be implemented as a computer program and stored in the memory rather than being physically implemented.

The memory 130 is operatively connected to the processor 120 and stores various pieces of information for operating the processor 120. The memory 130 may include a Read-Only Memory (ROM), a Random-Access Memory (RAM), a flash memory, a memory card, a storage medium, and/or other storage devices. When the embodiments are implemented in software, the techniques described herein may be implemented as modules (e.g., procedures and functions) that perform the functions described herein. The modules may be stored in the memory 130 and executed by the processor 120. The memory 130 may be implemented inside the processor 120. Alternatively, the memory 130 may be implemented outside the processor 120 and may be communicatively connected to the processor 120 through various methods known in the art.

The transceiver 110 is operatively connected to the processor 120 and transmits and/or receives a radio signal. The transceiver 110 includes a transmitter and a receiver. The transceiver 110 may include a baseband circuit to process a radio-frequency signal. The transceiver controls at least one antenna to transmit and/or receive a radio signal.

The speaker 161 outputs a sound related result of processing by the processor 120.

The microphone 162 receives a sound-related input to be used by the processor 120.

In the above, preferred embodiments of the present disclosure have been exemplarily described, but the disclosure of the present specification is not limited to such specific embodiments, and thus, it may be modified, changed, or improved in various forms within the scope set forth in the claims.

What is claimed is:

1. A server comprising:
   at least one transceiver;
   at least one processor; and
   at least one memory connected to the at least one processor and storing instruction that, based on being executed, cause the server to perform operations comprising:
   receiving first channel state information between a Telematics Communication Unit (TCU) and a base station and second channel state information between the TCU and an electronic device in a vehicle;
   receiving information on an available buffer size from the TCU;
   generating a first table based on a data rate in a downlink period between the base station, the TCU, and the electronic device in the vehicle, based on the first channel state information and the second channel state information;
   identifying a bottleneck period in the downlink period based on the information on the available buffer size; and
   transmitting downlink data to the TCU through the base station based on the first table.

2. The server of claim 1, wherein the operations further comprise: generating a third table based on a data rate in an uplink period between the base station, the TCU, the electronic device in the vehicle, based on the first channel state information and the second channel state information.

3. The server of claim 1, wherein the operations further comprise: generating a second table based on a data rate according to a pair of a reception (Rx) antenna of the TCU and a transmission (Tx) antenna of the TCU.

4. The server of claim 1, wherein the operations further comprise: reducing a data rate of the downlink data to resolve a bottleneck in the bottleneck period.

5. The server of claim 1, wherein the first table comprises a transmission priority and a data rate of the downlink data.

6. A Telematics Communication Unit (TCU) comprising:
   at least one transceiver;
   at least one processor; and
   at least one memory connected to the at least one processor and storing instructions that, based on being executed, cause the TCU to perform operations comprising:
   generating a table based on a channel state with at least one electronic device in a vehicle;
   calculating an available buffer size for transmitting data to the at least one electronic device in the vehicle;
   transmitting information on the available buffer size to a server through a base station; and
   identifying a bottleneck period in a downlink period between the base station, the TCU, and the at least one electronic device in the vehicle based on the information on the available buffer size.

7. The TCU of claim 6, wherein the operations further comprise:
   comparing the available buffer size with an expected residual data size in a buffer; and
   re-calculating the available buffer size based on the comparison.

8. The TCU of claim 6, wherein the operations further comprise: transmitting information on the channel state to the server through the base station.

9. The TCU of claim 6, wherein the operations further comprise: identifying information on a reception antenna of the TCU for receiving downlink data from the base station and information on a transmission antenna for the TCU to transmit the downlink data to the at least one electronic device in the vehicle.

10. The TCU of claim 9, wherein the operations further comprise: transmitting information on a pair of the reception antenna and the transmission antenna to the server through the base station.

11. The TCU of claim 6, wherein the operations further comprise: transmitting a pilot signal to the at least one electronic device in the vehicle; and
    receiving channel state information from the at least one electronic device in the vehicle.

12. The TCU of claim 6, wherein the at least one transceiver comprises a Long-Term Evolution (LTE) transceiver, a 5G transceiver, or a Wireless Local Area Network (WLAN) transceiver.

13. The TCU of claim 12, wherein the 5G transceiver comprises a first 5G transceiver using a sub-6 GHz band and a second 5G transceiver using mmWave.

14. The TCU of claim 6, wherein the at least one electronic device in the vehicle comprises at least one of an Engine Control Unit (ECU), a Domain Control Unit (DCU), a Local Interconnect Network (LIN) master, a Media Oriented System Transport (MOST) master, an Ethernet switch, a radar sensor, a LiDAR sensor, a camera, an Audio Video Navigation (AVN), or a Rear Seat Entertainment (RSE).

* * * * *